United States Patent
Herrmann

(10) Patent No.: US 7,627,896 B2
(45) Date of Patent: Dec. 1, 2009

(54) SECURITY SYSTEM PROVIDING METHODOLOGY FOR COOPERATIVE ENFORCEMENT OF SECURITY POLICIES DURING SSL SESSIONS

(75) Inventor: Conrad K. Herrmann, Oakland, CA (US)

(73) Assignee: Check Point Software Technologies, Inc., Redwood City, CA (US)

( * ) Notice: Subject to any disclaimer, the term of this patent is extended or adjusted under 35 U.S.C. 154(b) by 872 days.

(21) Appl. No.: 10/908,015

(22) Filed: Apr. 25, 2005

(65) Prior Publication Data

US 2006/0143700 A1 Jun. 29, 2006

Related U.S. Application Data

(60) Provisional application No. 60/593,235, filed on Dec. 24, 2004.

(51) Int. Cl.
*G06F 15/16* (2006.01)
*G06F 9/00* (2006.01)
*G06F 17/00* (2006.01)

(52) U.S. Cl. ..................................... 726/14
(58) Field of Classification Search .................. 726/14
See application file for complete search history.

(56) References Cited

U.S. PATENT DOCUMENTS

| | | | |
|---|---|---|---|
| 4,914,586 A | 4/1990 | Swinehart et al. | |
| 5,172,227 A | 12/1992 | Tsai et al. | |
| 5,412,427 A | 5/1995 | Rabbani et al. | |
| 5,475,817 A | 12/1995 | Waldo et al. | |
| 5,586,260 A | 12/1996 | Hu | |
| 5,623,601 A | 4/1997 | Vu | |
| 5,652,621 A | 7/1997 | Adams, Jr. et al. | |
| 5,682,152 A | 10/1997 | Wang et al. | |
| 5,745,701 A | 4/1998 | Nguyen-Thai et al. | |
| 5,754,227 A | 5/1998 | Fukuoka | |
| 5,764,887 A | 6/1998 | Kells et al. | |
| 5,798,794 A | 8/1998 | Takahashi | |
| 5,815,574 A | 9/1998 | Fortinsky | |
| 5,818,525 A | 10/1998 | Elabd | |
| 5,825,890 A * | 10/1998 | Elgamal et al. | 713/151 |
| 5,828,833 A | 10/1998 | Belville et al. | |
| 5,832,211 A | 11/1998 | Blakley et al. | |
| 5,838,903 A | 11/1998 | Blakely et al. | |
| 5,848,193 A | 12/1998 | Garcia | |
| 5,857,191 A | 1/1999 | Blackwell et al. | |
| 5,864,665 A | 1/1999 | Tran | |
| 5,875,296 A | 2/1999 | Shi et al. | |
| 5,881,230 A | 3/1999 | Christensen et al. | |
| 5,907,610 A | 5/1999 | Onweller | |

(Continued)

*Primary Examiner*—Christian LaForgia
*Assistant Examiner*—James Turchen
(74) *Attorney, Agent, or Firm*—John A. Smart

(57) ABSTRACT

A security system providing methodology for cooperative enforcement of security policies during SSL sessions is described. In one embodiment, for example, a method is described for controlling SSL (Secure Sockets Layer) communication, the method comprises steps of: defining rules indicating conditions under which a machine is permitted to participate in an SSL session; trapping an attempt by a particular application running on the machine to participate in an SSL session, by intercepting the particular application's attempt to provide authentication; determining whether the machine complies with the rules; allowing the attempt to succeed when the machine complies with the rules; and otherwise blocking the attempt when the machine does not comply with the rules.

45 Claims, 12 Drawing Sheets

U.S. PATENT DOCUMENTS

| | | |
|---|---|---|
| 5,913,088 A | 6/1999 | Moghadam et al. |
| 5,917,542 A | 6/1999 | Moghadam et al. |
| 5,926,105 A | 7/1999 | Wakamatsu |
| 5,987,611 A | 11/1999 | Freund |
| 6,008,847 A | 12/1999 | Bauchspies |
| 6,028,807 A | 2/2000 | Awsienko |
| 6,064,437 A | 5/2000 | Phan et al. |
| 6,091,777 A | 7/2000 | Guetz et al. |
| 6,125,201 A | 9/2000 | Zador |
| 6,154,493 A | 11/2000 | Acharya et al. |
| 6,167,438 A | 12/2000 | Yates et al. |
| 6,243,420 B1 | 6/2001 | Michell et al. |
| 6,247,062 B1 | 6/2001 | Sarkar |
| 6,249,820 B1 | 6/2001 | Dobbins et al. |
| 6,269,099 B1 | 7/2001 | Borella et al. |
| 6,304,973 B1 | 10/2001 | Williams |
| 6,356,929 B1 | 3/2002 | Gall et al. |
| 6,389,534 B1 * | 5/2002 | Elgamal et al. ............ 713/164 |
| 6,393,484 B1 | 5/2002 | Massarani |
| 6,438,612 B1 | 8/2002 | Ylonen et al. |
| 6,606,708 B1 | 8/2003 | Devine et al. |
| 6,993,651 B2 * | 1/2006 | Wray et al. ................ 713/151 |
| 2003/0172090 A1 * | 9/2003 | Asunmaa et al. ........... 707/200 |
| 2004/0103317 A1 * | 5/2004 | Burns ........................ 713/201 |

* cited by examiner

SECURITY SYSTEM PROVIDING METHODOLOGY FOR COOPERATIVE ENFORCEMENT OF SECURITY POLICIES DURING SSL SESSIONS

CROSS REFERENCE TO RELATED APPLICATIONS

The present application is related to and claims the benefit of priority of the following commonly-owned, presently-pending provisional application(s): application Ser. No. 60/593,235, filed Dec. 24, 2004, entitled "Security System Providing Methodology for Cooperative Enforcement of Security Policies During SSL Sessions", of which the present application is a non-provisional application thereof. The present application is related to the following commonly-owned, presently-pending application(s): application Ser. No. 10/605,189, filed Sep. 12, 2003, entitled "Security System with Methodology for Interprocess Communication Control"; application Ser. No. 10/708,660, filed Mar. 17, 2004, entitled "System Providing Methodology for Access Control with Cooperative Enforcement". The disclosures of each of the foregoing applications are hereby incorporated by reference in their entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF INVENTION

1. Field of the Invention

The present invention relates generally to data processing environments and, more particularly, to an improved system and methodology for securing access to computer systems, networks, and related resources.

2. Description of the Background Art

The first computers were largely stand-alone units with no direct connection to other computers or computer networks. Data exchanges between computers were mainly accomplished by exchanging magnetic or optical media such as floppy disks. Over time, more and more computers were connected to each other using Local Area Networks or "LANs". In both cases, maintaining security and controlling what information a computer user could access was relatively simple because the overall computing environment was limited and clearly defined.

With the ever-increasing popularity of the Internet, however, more and more computers are connected to larger networks. Providing access to vast stores of information, the Internet is typically accessed by users through Web "browsers" (e.g., Microsoft® Internet Explorer or Netscape Navigator) or other Internet applications. Browsers and other Internet applications include the ability to access a URL (Universal Resource Locator) or "Web" site. In the last several years, the Internet has become pervasive and is used not only by corporations, but also by a large number of small business and individual users for a wide range of purposes.

As more and more computers are now connected to the Internet, either directly (e.g., over a dial-up or broadband connection with an Internet Service Provider or "ISP") or through a gateway between a LAN and the Internet, a whole new set of challenges face LAN administrators and individual users alike: these previously closed computing environments are now open to a worldwide network of computer systems. A particular set of challenges involves attacks by perpetrators (hackers) capable of damaging the local computer systems, misusing those systems, and/or stealing proprietary data and programs.

The software industry has, in response, introduced a number of products and technologies to address and minimize these threats, including "firewalls", proxy servers, and similar technologies—all designed to keep malicious users (e.g., hackers) from penetrating a computer system or corporate network. Firewalls are applications that intercept the data traffic at the gateway to a Wide Area Network ("WAN") and check the data packets (i.e., Internet Protocol packets or "IP packets") being exchanged for suspicious or unwanted activities.

Another security measure that has been utilized by many users is to install an end point security (or personal firewall) product on a computer system to control traffic into and out of the system. An end point security product can regulate all traffic into and out of a particular computer. One such product is assignee's ZoneAlarm® product that is described in detail in U.S. Pat. No. 5,987,611, the disclosure of which is hereby incorporated by reference. For example, an end point security product may permit specific "trusted" applications to access the Internet while denying access to other applications on a user's computer. To a large extent, restricting access to "trusted" applications is an effective security method. However, despite the effectiveness of end point security products, issues remain in protecting computer systems against attack by malicious users and applications.

One particular problem that remains is how to secure access to certificates that exist on a user's machine and that are used for communicating and authenticating the user. A digital certificate (or "certificate") is a secure electronic identity that certifies the identity of the holder. The most common use of a certificate is to verify that a user sending a message is who he or she claims to be, and to provide the receiver with the means to encode a reply. An individual wishing to send an encrypted message applies for a digital certificate from a Certificate Authority (CA). To create a certificate, the CA combines a user's public key with the user information (e.g., as defined by X.509), then signs the information with its private key. The digital certificate issued by the CA contains a variety of identification information, including a user name, a serial number, expiration dates, a copy of the certificate holder's public key (used for encrypting and decrypting messages and digital signatures), and the digital signature of the certificate-issuing authority so that a recipient can verify that the certificate is real. Anyone receiving the certificate can verify its authenticity with the CA's public key. The recipient of an encrypted message uses the CA's public key to decode the digital certificate attached to the message, verifies it as issued by the CA, and then obtains the sender's public key and identification information held within the certificate. With this information, the recipient can send an encrypted reply. The authenticity of the CA's public key can be further verified via the chain of trust that exists within the PKI (public-key infrastructure), which is a popular mechanism for distributing keys in a secure way. A PKI may be installed on an enterprise network, or it may be available in a public environment.

X.509 is a widely used standard for defining digital certificates. X.509 defines a certificate format for binding public keys to X.500 distinguished path names. X.509 supports both secret-key (single-key) cryptography and public-key cryptography. X.509 version 3 defines the field contents of a certificate, which is a record of data that contains 11 major fields. The fields in the certificate define the issuing CA, the signing algorithms, how long the certificate is valid, and information about the owner of the certificate. The version 3 extension fields are useful for adding additional information into the certificate. This information can be customized to fit a particular issuer's own requirements. For example, a retailer could add unique customer information. These fields may provide access control information, which authorizes the holder of the certificate to access network or system resources. Thus, version 3 X.509 certificates can play a unique role in managing network security. For further description of X.509, see RFC 2527: Internet X.509 Public Key Infrastructure Certificate Policy and Certification Practices Framework, by the Network Working Group, the disclosure of which is hereby incorporated by reference. A copy of RFC 2527 is available on the Internet from ietf.org (e.g., currently at www.ietf.org/rfc/rfc2527.txt).

With PCs and other computing devices today, a "certificate store" is provided (e.g., by the operating system) for use by applications. A certificate store is basically a repository for storing certificates that are used for communicating. For example, machines running Microsoft Windows have access to Windows' certificate store. Other available encryption applications/solutions (e.g., PGP, Open SSL, or the like) may include their own certificate store (i.e., beyond that provided by the operating system). An individual application itself may include its own certificate store. In Windows, the certificate store is subdivided into individual portions, such as a particular portion for a given user or for a given machine. In addition, certificates may be stored separately from the computer's general disk and memory storage in cryptographic "smart cards" or other storage devices, which prevent software on the computer from being able to retrieve the full private and public key pairs from the certificate.

Today, there is a need to balance cooperative enforcement (i.e., make sure a given client is compliant with an applicable security policy) with the existing protocols and applications. Consider, for instance, a user who is using a Web browser with SSL (Secure Sockets Layer), which is a protocol for secure network communications using a combination of public and secret key technology. The problem that presents itself is how to inspect the client PC to make sure it is compliant with a set of security policy requirements before allowing the client to log on to a corporate Web site. One approach to this problem is to download an ActiveX component to the client machine, where the ActiveX component has an engine that knows how to scan the client machine. (ActiveX refers to Microsoft's component technology based on Microsoft's Component Object Model (COM)). Upon concluding a successful scan, the ActiveX component may post a message back to the corporate Web server indicating that the client machine is compliant. In response to receiving such a message, the corporate Web server may grant access to that client machine. Typically, this means that the server grants access to a password page, where the individual user may authenticate himself or herself. In the foregoing approach, a two-stage process is employed. A component is first downloaded for scanning the client machine, followed by the user authenticating himself/herself. The Extensible Authentication Protocol (EAP) may be used to perform a similar but reversed approach where the user is first authenticated and then the client machine is scanned.

A monitoring protocol, such as Zone Labs' client monitoring protocol (CMP), may also be used to check the security attributes of the client device. (See, e.g., above mentioned commonly-owned, co-pending U.S. patent application Ser. No. 10/708,660. For example, a security module on a router may send a CMP challenge to a client device seeking access to a network. At that point, the router is not interested in authenticating the client but is instead interested in ensuring compliance to an applicable security policy. The CMP challenge comprises a UDP message having a fixed header and additional parameters that can be selected as options in order to check for particular attributes or conditions at the client device. Upon receipt of a challenge packet, a client security module formulates an appropriate response message using the same CMP protocol. The response message describes whether the client is currently compliant with the requirements provided in the CMP challenge. If the client is in compliance, the client is permitted to access the network. Otherwise, the client gets restricted access (or no access).

The basic problem underlying all of the foregoing approaches is that extra work must be layered on top of the existing protocols. In the case of CMP, an entirely different protocol must be employed, which has the additional disadvantage that it may not work through intervening NAT (Network Address Translation) boxes. EAP has the disadvantage that it only works with others who are also using EAP as the authentication system for their switches and routers; it does not work for long-distance, remote communication.

The ActiveX approach fares no better. The problem with using a downloaded ActiveX component is that again one is using an out-of-bandwidth channel that is not seamlessly integrated with existing protocols. Also, the approach assumes that the client machine's browser in fact supports ActiveX, or has been configured to allow execution of downloadable ActiveX components. Not all browsers support ActiveX, so the assumption is far from perfect. Further, the user may be employing a product that is not even a Web browser. Therefore, it is clear that one cannot assume that a client machine is going to be willing to download an ActiveX component for scanning that machine.

All told, the problem that remains is how to prevent a user from logging on to a site (e.g., corporate Web server) if that user does not pass the client compliance test, and do so in a manner that is seamlessly accommodated by existing protocols (e.g., SSL), and the application programs that implement those protocols (e.g., a web browser). The present invention provides a solution to this and other problems.

SUMMARY OF INVENTION

A security system providing methodology for cooperative enforcement of security policies during SSL sessions is described. In one embodiment, for example, a method of the present invention is described for controlling SSL (Secure Sockets Layer) communication, the method comprises steps of: defining rules indicating conditions under which a machine is permitted to participate in an SSL session; trapping an attempt by a particular application running on the machine to participate in an SSL session, by intercepting the particular application's attempt to provide authentication; determining whether the machine complies with the rules; allowing the attempt to succeed when the machine complies with the rules; and otherwise blocking the attempt when the machine does not comply with the rules.

In another embodiment, for example, a system of the present invention for controlling a certificate-based protocol session is described that comprises: a security policy indicating conditions under which a client is permitted to participate in a certificate-based protocol session; a module that traps an attempt at the client to participate in the certificate-based protocol session, by intercepting a request to retrieve a certificate for authenticating the client; a module that determines whether the client complies with the security policy; and a module that prevents retrieval of the certificate when the client does not comply with the security policy.

In yet another embodiment, for example, an improved method of the present invention is described for retrieving certificates for use in certificate-based protocols, the improvement comprises: monitoring requests to retrieve certificates at a machine, for ensuring the machine's compliance with a security policy as a prerequisite to certificate retrieval; as each given certificate is requested to be retrieved at the machine, determining whether the machine complies with the security policy; and blocking retrieval of a given requested certificate in instances where the machine violates the security policy.

In another embodiment, for example, a system of the present invention is described for controlling access to certificates comprises: a certificate store for storing certificates on a machine; a security policy specifying conditions that the machine must comply with; means for monitoring requests for retrieving a certificate from the certificate store; means for monitoring compliance of the machine with the security policy; and means for preventing retrieval of a particular certificate, when the machine does not comply with the security policy.

DETAILED DESCRIPTION

Glossary

Figure 1:
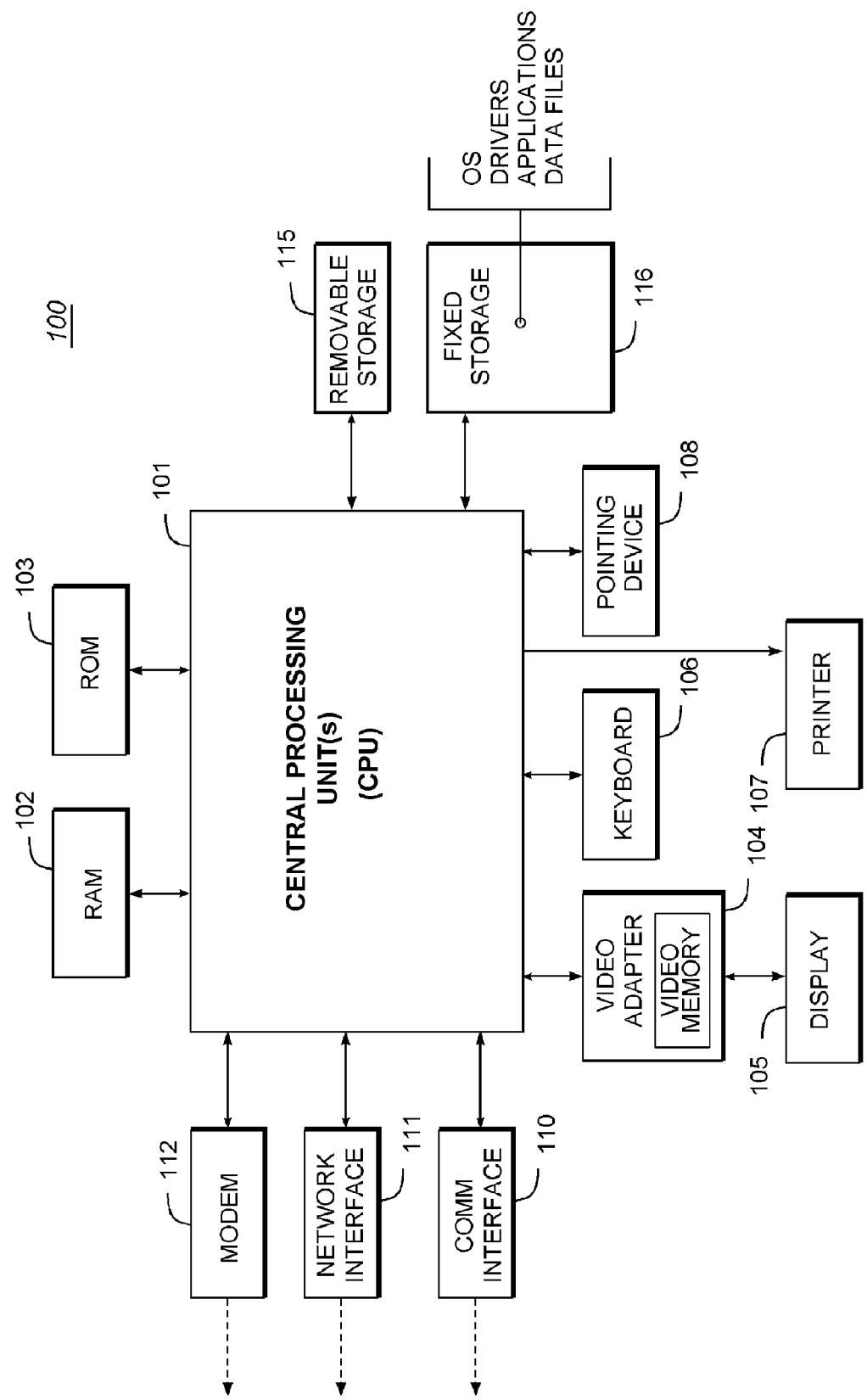
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

CryptoAPI: Refers to the Microsoft® Cryptography API (application programming interface) that is available with Microsoft Windows. The Cryptography API contains functions that allow applications to encrypt or digitally sign data in a flexible manner, while providing protection for the user's sensitive private key data. All cryptographic operations are performed by independent modules known as cryptographic service providers (CSPs). One CSP, the Microsoft RSA Base Provider, is included with the operating system. Each CSP has a key database in which it stores its persistent cryptographic keys. Each key database contains one or more key containers, each of which contains all the key pairs belonging to a specific user (or Cryptography API client). Each key container is given a unique name, which applications provide to the CryptAcquireContext function when acquiring a handle to the key container. For further description, see, e.g., Coleridge, R., "The Cryptography API, or How to Keep a Secret," Microsoft Developer Network Technology Group, Aug. 19, 1996, the disclosure of which is hereby incorporated by reference. A copy of the article is available via the Internet (e.g., currently at msdn.microsoft.com/library/?url=/library/en-us/dncapi/html/msdn_cryptapi.asp).

End point security: End point security is a way of managing and enforcing security on each computer instead of relying upon a remote firewall or a remote gateway to provide security for the local machine or environment. End point security involves a security agent that resides locally on each machine. This agent monitors and controls the interaction of the local machine with other machines and devices that are connected on a LAN or a larger wide area network (WAN), such as the Internet, in order to provide security to the machine.

HTML: HTML stands for HyperText Markup Language, the authoring language used to create documents on the World Wide Web. HTML defines the structure and layout of a Web document by using a variety of tags and attributes. For further description of HTML, see e.g., "HTML 4.01 Specification", a World Wide Web consortium recommendation dated Dec. 24, 1999, the disclosure of which is hereby incorporated by reference. A copy of this specification is available via the Internet (e.g., currently at www.w3.org/TR/REC-html40).

HTTP: HTTP is the acronym for HyperText Transfer Protocol, which is the underlying communication protocol used by the World Wide Web on the Internet. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in "RFC 2616: Hypertext Transfer Protocol—HTTP/1.1," the disclosure of which is hereby incorporated by reference. RFC 2616 is available from the World Wide Web Consortium (W3C), and is available via the Internet (e.g., currently at www.w3.org/Protocols/). Additional description of HTTP is available in the technical and trade literature, see e.g., Stallings, W., "The Backbone of the Web," BYTE, October 1996, the disclosure of which is hereby incorporated by reference.

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

Security policy: In general terms, a security policy is an organization's statement defining the rules and practices that regulate how it will provide security, handle intrusions, and recover from damage caused by security breaches. An explicit and well-defined security policy includes a set of rules that are used to determine whether a given subject will be permitted to gain access to a specific object. A security policy may be enforced by hardware and software systems that effectively implement access rules for access to systems and information. Further information on security policies is available in "RFC 2196: Site Security Handbook, (September 1997)", the disclosure of which is hereby incorporated by reference. A copy of RFC 2196 is available from the IETF via the Internet (e.g., currently at www.ietf.org/rfc/rfc2196.txt). For additional information, see also, e.g., "RFC 2704: The KeyNote Trust Management System Version 2", the disclosure of which is hereby incorporated by reference. A copy of RFC 2704 is available from the IETF via the Internet (e.g., currently at www.ietf.org/rfc/rfc2704.txt). In this document, "security policy" or "policy" refers to a set of security policies and rules employed by an individual or by a corporation, government entity, or any other organization operating a network or other computing resources.

Spyware: Refers broadly to any software that covertly gathers user information without his or her knowledge. Once installed, spyware monitors user activities (e.g., keyboard input) and transmits that information in the background to someone else. Spyware exists that can gather confidential financial information, including Social Security numbers, bank passwords, and credit card numbers; once gathered, that information can be used by criminals for fraudulent purposes.

SSL: SSL is an abbreviation for Secure Sockets Layer, a protocol developed by Netscape for transmitting private documents over the Internet. SSL works by using a public key to encrypt data that is transferred over the SSL connection. Both Netscape Navigator and Microsoft Internet Explorer support SSL, and many Web sites use the protocol to obtain confidential user information, such as credit card numbers. SSL creates a secure connection between a client and a server, over which data can be sent securely. For further information, see e.g., "The SSL Protocol, version 3.0", (Nov. 18, 1996), from the IETF, the disclosure of which is hereby incorporated by reference. See also, e.g., "RFC 2246: The TLS Protocol, version 1.0", available from the IETF. A copy of RFC 2246 is available via the Internet (e.g., currently at www.itef.org/rfc/rfc2246.txt).

TCP: TCP stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see e.g., "RFC 793: Transmission Control Program DARPA Internet Program Protocol Specification", the disclosure of which is hereby incorporated by reference. A copy of RFC 793 is available via the Internet (e.g., currently at www.ietf.org/rfc/rfc793.txt).

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial", the disclosure of which is hereby incorporated by reference. A copy of RFC 1180 is available via the Internet (e.g., currently at www.ietf.org/rfc/rfc1180.txt).

UDP: UDP stands for User Datagram Protocol, a connectionless protocol that, like TCP, runs on top of IP networks. Unlike TCP/IP, UDP/IP provides very few error recovery services, offering instead a direct way to send and receive datagrams over an IP network. UDP is used primarily for broadcasting messages over a network. For additional information on UDP, see RFC 768, "User Datagram Protocol", the disclosure of which is hereby incorporated by reference. A copy of RFC 768 is available via the Internet (e.g., currently at www.ietf.org/rfc/rfc768.txt).

URL: URL is an abbreviation of Uniform Resource Locator, the global address of documents and other resources on the World Wide Web. The first part of the address indicates what protocol to use, and the second part specifies the IP address or the domain name where the resource is located.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
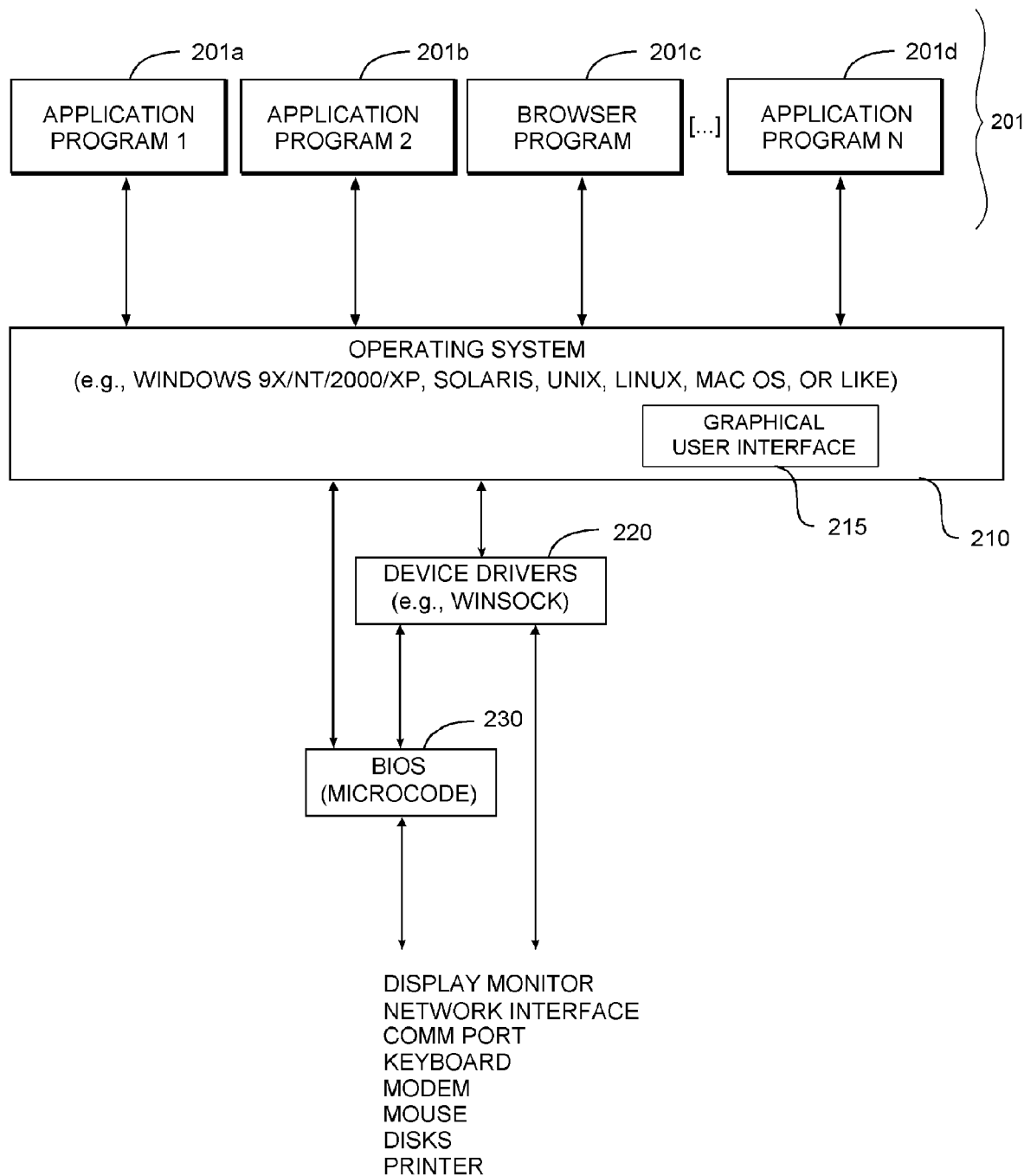
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable processor-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Introduction to Cooperative Enforcement of Security Policies During SSL Sessions At the outset, it is helpful to briefly review SSL (Secure Sockets Layer), which is a protocol for secure network communications using a combination of public and secret key technology. A typical SSL session occurs between a client (e.g., PC running browser software) and a server (e.g., Web server hosting a Web site). Consider an application such as Microsoft Internet Explorer that is trying to communicate over SSL to a Web site. SSL supports a mutual authentication mode that requires the server to send its certificate to the client for verification by the client (e.g., with VeriSign as certificate authority (VeriSign, Inc., Mountain View, Calif.)), and requires the client to send its certificate to the server for verification by the server. Once these authentications have occurred, data may then be exchanged over an encrypted channel. Internet Explorer includes built-in SSL support, so that it may appropriately respond to the server's request for the client certificate. More particularly, Internet Explorer will, in response to that request, invoke the Microsoft Cryptography API ("CryptoAPI") used in Windows to retrieve a relevant certificate from Windows' certificate store. The CryptoAPI functions to obtain an appropriate matching certificate from the certificate store, one that may be returned in response to the request (in a form that may be sent to the server). Here, the CryptoAPI returns a matching certificate based on parameters that are provided (upon invocation by Internet Explorer). In this case, the Microsoft Windows CryptoAPI will understand what type of "root"—that is, the issuing certificate authority (CA) the server is interested in. The CA in this case will be one that is local to the client's domain. For example, for a client connecting from domain zonelabs. com, the server will request a zonelabs.com certificate. The user's machine (i.e., client), upon examining its certificate store (pertaining to the particular user currently logged into that machine), will typically find that the domain-specific certificate that matches the server's request is the user's own domain-specific certificate (e.g., conrad.zonelabs.com certificate) during its search through the certificate store. Note that this search does not turn up a certificate for another user at that domain (e.g., john.zonelabs.com), since the certificate store made available is specific for the currently logged-in user.

In accordance with the present invention, the above-described SSL session is modified as follows. When Internet Explorer calls the CryptoAPI to retrieve the user certificate (i.e., conrad.zonelabs.com) during SSL negotiation, the security system of the present invention intercepts that call and checks the client pursuant to predefined required parameters. The required parameters may include, for instance, parameters that were installed when the certificate was installed. The required parameters reflect a security policy. In the currently preferred embodiment, at the time that the certificate is installed, a corresponding policy is also installed (i.e., that refers to that specific certificate). The policy is readable by the security system of the present invention (e.g., using a client-side agent running along side of the certificate store). For example, the policy may specify that in order for the certificate to be retrieved from the certificate store, the machine must have antivirus software running and that software must be up-to-date (including latest virus definition file).

As an alternative, the security system of the present invention may implement its own certificate store that includes associated policies. Each policy specifies rules/conditions under which a given certificate may be retrieved (e.g., for purposes of forming an SSL session). This includes endpoint security policy features, in addition to user access considerations. Currently in Windows, the certificate store essentially operates on the basis of user access. For instance, one user cannot retrieve certificates for another user (unless permission is given), but the user can request the certificate for the user's machine. The policy may be stored in the certificate store, stored in the certificates themselves (e.g., in certificate fields that accommodate arbitrary data), or stored somewhere outside.

In the currently preferred embodiment, the policy applied may be one based on existing Zone Labs (present assignee) TrueVector technology with respect to cooperative enforcement. For example, the policy may be cooperatively enforced in the manner described in commonly-owned, co-pending U.S. patent application Ser. No. 10/708,660, the disclosure of which is hereby incorporated by reference in its entirety, including any appendices or attachments thereof, for all purposes. Examples include verifying that the security engine (TrueVector) is running, that antivirus protection is running and up-to-date, that anti-spyware software is running to ensure that spyware and key loggers are not running, and the like. Importantly, an association is maintained between the policy and the corresponding certificate, and that association is checked whenever an attempt is made by an application (e.g., invoking the CryptoAPI) to access the certificate store for retrieving the certificate. Specifically, requests to the certificate store are intercepted and "filtered."

With current certificate stores (e.g., Microsoft Windows certificate store), there is no existing filtering mechanism provided. Therefore, a filtering mechanism is added in order to implement the present invention. In the currently preferred embodiment (running under Microsoft Windows), the CryptoAPI is "hooked" for purposes of trapping or intercepting calls. In this manner, an API function call to the CryptoAPI for retrieving a certificate may be hooked by the security system of the present invention. At this point, the security system may in effect take over control of the function call/ invocation. For example, the security system may prevent the invocation from succeeding; the security system may return an error (code) for the function; and the security system may in fact return a certificate of its own choosing (including a bogus certificate). Additionally, the security system may take over how the certificates are sorted (thereby affecting the precedence of individual certificates).

Some existing certificate stores (i.e., other than that provided by Microsoft Windows) include the ability to plug in rules affecting how certificates are searched. Consider, for instance, an application that requests retrieval of a certificate, and that multiple certificates are available in the certificate store that match that request. For example, an SAP application may request retrieval of the user's certificate (e.g., conrad.zonelabs.com), but it is most interested in a SAP-specific one (e.g., SAP.conrad.zonelabs.com). In that scenario, the intent is that the system search/filter through all of the matching certificates (e.g., *.conrad.zonelabs.com) to find the one that is a best match. The security system of the present invention may affect filtering pursuant to a corresponding policy such that only a best match (if any) is returned. In that case, the security system of the present invention takes over filtering and prevents the return of other matching certificates (i.e., other than the best match).

It is known in the art to apply a user-based restriction to control who can access certificates, such as in the Microsoft Windows environment where a given user can access certain certificate stores (but not the certificate stores of other users). In other implementations (e.g., Open SSL and Java certificate stores), it is known to apply a password to protect access to a given certificate store (such that effectively only the user knowing the password can access the certificate store). However, apart from those rudimentary controls, there is no mechanism in the art to provide context-sensitive control over certificate access. If a security system is able to prevent someone from retrieving a certificate or the system is able to substitute a different one of its choosing, then the security system may influence certificate retrieval, including sending back to the (requesting) server the correct certificate, no certificate, or a substitute certificate. In this manner, the security system may influence the SSL session by controlling how certificate retrieval occurs.

System Components

Figure 3:
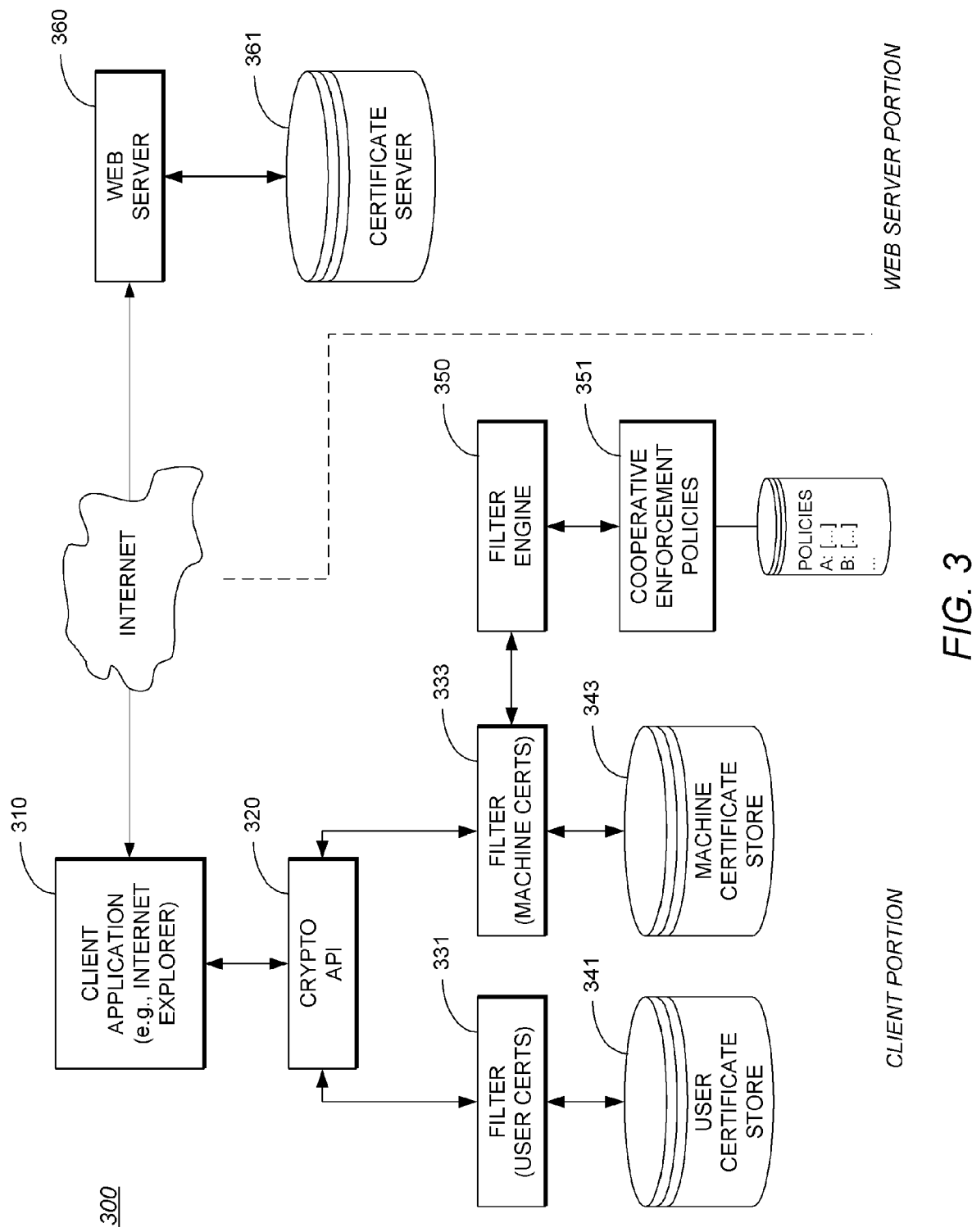
FIG. 3 is a block diagram illustrating a communication environment comprising a client (e.g., PC with browser software) communicating with a server (e.g., Web site hosted by a Web server) that is secured in accordance with the present invention.

FIG. 3 is a block diagram illustrating a communication environment 300 comprising a client (e.g., PC with browser software) communicating with a server (e.g., Web site hosted by a Web server) that is secured in accordance with the present invention. As shown, the client portion of the environment includes application software (e.g., Internet Explorer) 310, CryptoAPI 320, filters 331, 333, user and machine certificate stores 341, 343, filter engine 350, and cooperative enforcement policies 351. The client connects over the Internet to a target Web site that is hosted by a Web server. As shown, the server portion of the environment 300 includes a Web server 360 and a certificate server 361.

In operation, the client application 310 communicates over the Internet with Web server 360. The Web server 360 is configured for SSL operation, using dual mode authentication (i.e., both the client and the server must authenticate). On the client machine, the client application 310 (e.g., Internet Explorer) uses the CryptoAPI 320 to access relevant certificates. In Windows, the CryptoAPI is a collection of cryptographic functions, grouped in four categories: CSP (cryptographic service provider) functions, Key functions, Encryption functions, and Hashing functions. Of particular interest herein is the CryptoAPI's management of the Windows certificate store, which makes available a user certificate store (shown at 341) and a machine certificate store (shown at 343). Using the CryptoAPI, client application software can select which store to use. In the case of Internet Explorer as the client application, Internet Explorer will decide which store to use and what type of certificate to look for based on what the server wants (i.e., in the SSL challenge). In other words, Internet Explorer will use the CryptoAPI to enumerate the appropriate certificate that can be found in whichever store is appropriate for the server request.

In accordance with the present invention, an API hook is installed (filters 331, 333) to filter the responses, and only return back to the client application responses that are allowed pursuant to the corresponding security policy. Upon intercepting a certificate request, the filters 331, 333 pass the request off to the filter engine 350. In the currently preferred embodiment, the filter engine 350 is implemented as part of an endpoint security engine (Zone Labs TrueVector). The filter engine 350 evaluates what rule should be applied to the particular intercepted request, as the engine is able to correlate policies with requested keys (or a given certificate may have embedded within itself a usage policy). In the case where the engine identifies a certificate that has an associated policy, the filter engine 350 may search through the cooperative enforcement policies (database) 351 for locating the appropriate policy to apply. The located policy will itself have requirements (e.g., antivirus running/up-to-date and the like). Upon retrieving the appropriate policy, the filter engine 350 may execute that policy on the client machine in order to determine whether the machine meets the policy's requirements. The determination of the state of the client machine may be done using the existing TrueVector architecture which is described in detail in U.S. Pat. No. 5,987,611, and more recently in commonly-owned, co-pending U.S. application Ser. No. 10/605,189 titled "Security System with Methodology for Interprocess Communication Control", the disclosure of which are hereby incorporated by reference in their entirety, including any appendices or attachments thereof, for all purposes. In the case that the client machine is compliant, the filter engine 350 may allow the sought-after certificate to be returned to the CryptoAPI 320, and then onto the client application 310 for use as an SSL certificate. Otherwise (i.e., noncompliant case), the filter engine 350 prevents the certificate from being returned to the CryptoAPI.

If desired, the filter engine 350 may alternatively return a substitute certificate. In that case, for example, the filter engine 350 may return a "guest" or "noncompliant" certificate. The Web server 360 itself may undertake a particular course of action upon receiving such a substitute certificate. For instance, upon receiving a guest certificate, the Web server may allow the client only guest access (privileges)—that is, access with some constrained level of rights. This may include shunting the client (i.e., redirecting the browser) to a "sandbox" (e.g., Web page) with information indicating what requirements the user must fulfill to bring the client machine back into compliance. With the above approach, for example, a client that is noncompliant as to antivirus protection may receive a substitute certificate from the filter engine 350 that indicates antivirus noncompliance. The Web server, upon receiving a "virus update" substitute certificate, may redirect the client (browser) to a "sandbox" Web page that includes appropriate links for installing/updating antivirus protection. If desired, the Web server may be configured to skip the sandbox and instead initiate client downloading of an appropriate antivirus program.

The substitute certificates may be ones that are authenticated (by a CA) or they may be ones that are manufactured dynamically. In the latter case, the substitute certificate is one that is manufactured based on usage. A manufactured substitute certificate that is not properly authenticated would of course be a bogus certificate for purposes of authentication, but is nevertheless useful in other ways. As shown above, client state/usage information may be embedded within a certificate and returned via a known protocol (SSL) back to the server, which then may act on that information.

Manufactured substitute certificates may be cached as appropriate. For example, the filter engine 350 may manufacture a compliance certificate every hour, which is valid for one hour. Then, any machine/process (with appropriate rights) that wants to know whether the client machine is currently compliant need only ask for the current cached compliance certificate. If the compliance certificate exists and is valid, then the client machine is currently verified by the security system as being compliant with the applicable policy. Otherwise, the client machine is noncompliant.

In a more complex embodiment, a proper authenticated substitute certificate may be obtained by allowing the filter engine 350 to communicate with a proper certificate authority (or an agent to which the certificate authority has delegated). In such a case, the above-mentioned caching mechanism may be employed for purposes of efficiency. For example, the filter engine 350 may establish communication with a certificate authority on an hourly basis and get a proper CA certificate if the filter engine 350 establishes that the client machine complies with the applicable policy. If the filter engine 350 cannot establish that the client is compliant, then the certificate authority will not issue a valid CA-created substitute certificate.

It should be noted that in the simplest embodiment, the SSL server does not perform additional parsing of the certificate (beyond that which it already does). This allows the technique of the present invention to be used with existing SSL servers without any modification whatsoever. In such an embodiment, the processing already built into existing SSL servers (i.e., for processing valid, guest, and bogus certificates) may be exploited for providing basic support for the methodology of the present invention. Typically, existing servers will have built-in capability to process guest certificates (e.g., for redirecting to a particular target guest Web page). In instances where additional processing/parsing is desired, the SSL server may include ASP (Active Server Pages) Web pages. ASP allows Web developers to create server-side scripted templates that generate dynamic, interactive web server applications. With special programmatic codes embedded in standard HTML pages, a user can access data in a database, interact with page objects such as Active-X or Java components, or create other types of dynamic output. The HTML output by an Active Server Page is browser independent, thus allowing it to be read by Microsoft Explorer, Netscape Navigator, or most other browsers.

In the currently preferred embodiment running under Microsoft Windows (i.e., a Windows-based embodiment), the certificate stores are software-based. However, Microsoft Windows also supports hardware-based certificate stores, for example, a certificate store that is offloaded to a USB-based smart card. A smart card is a card that is embedded with either a microprocessor and a memory chip or only a memory chip with non-programmable logic. The microprocessor card can add, delete, and otherwise manipulate information on the card, while a memory-chip card (for example, pre-paid phone cards) can only undertake a pre-defined operation. In a microprocessor-based smart card embodiment, policy enforcement may be offloaded to the smart card. The advantage of that approach is that a user could be issued a smart card that also includes the policy as well as the certificate on the card itself. This provides a higher degree of protection since no one will be able to retrieve the certificate from the card unless the client machine is safe (i.e., compliant with the policy). Even if policy agent software is not correctly installed on the client machine, the smart card (logic) will itself nevertheless be able to enforce the policy.

Related to smart cards is the notion of the trusted computing platform. For example, Microsoft Palladium is a system that combines software and hardware controls to create a "trusted" computing platform. Palladium provides a virtual vault residing within each computer, allowing users to store encrypted information and only authorize certain entities to see it. Combining a Palladium-compatible operating system (e.g., Microsoft's forthcoming Longhorn release) with Palladium-specific hardware creates a special microkernel-like environment, called the Trusted Operating Root (TOR), that can instantiate the Palladium software. As the software loads, it sets aside a secure, or trusted, processing environment called the vault within the hardware chipset. Data in the vault is physically isolated, protected, and not accessible to other applications and services on the PC. Only users, processes, services, applications, other computers, or other entities that can be verified as trustworthy can access the vault's data. The hardware channels inside Palladium-based PCs are designed to impervious to snooping, hardware/software-based attacks, and spoofing/impersonation. This affords a physical chain of trust within the computer that allows a Web server to be very sure about the identity of the client.

Of particular interest is the ability of a trusted computing platform to validate the currently running processes on a given machine. Therefore, the techniques of the present invention may be extended to accommodate such machines to provide a higher level of assurance of compliance with an applicable policy. Therefore, for example, if a policy mandates that a particular version of antivirus software must be running, the system of the present invention may invoke trusted computing functionality to ascertain with a high degree of certainty that a particular process is in fact running.

ALTERNATE EMBODIMENTS

Figure 4:
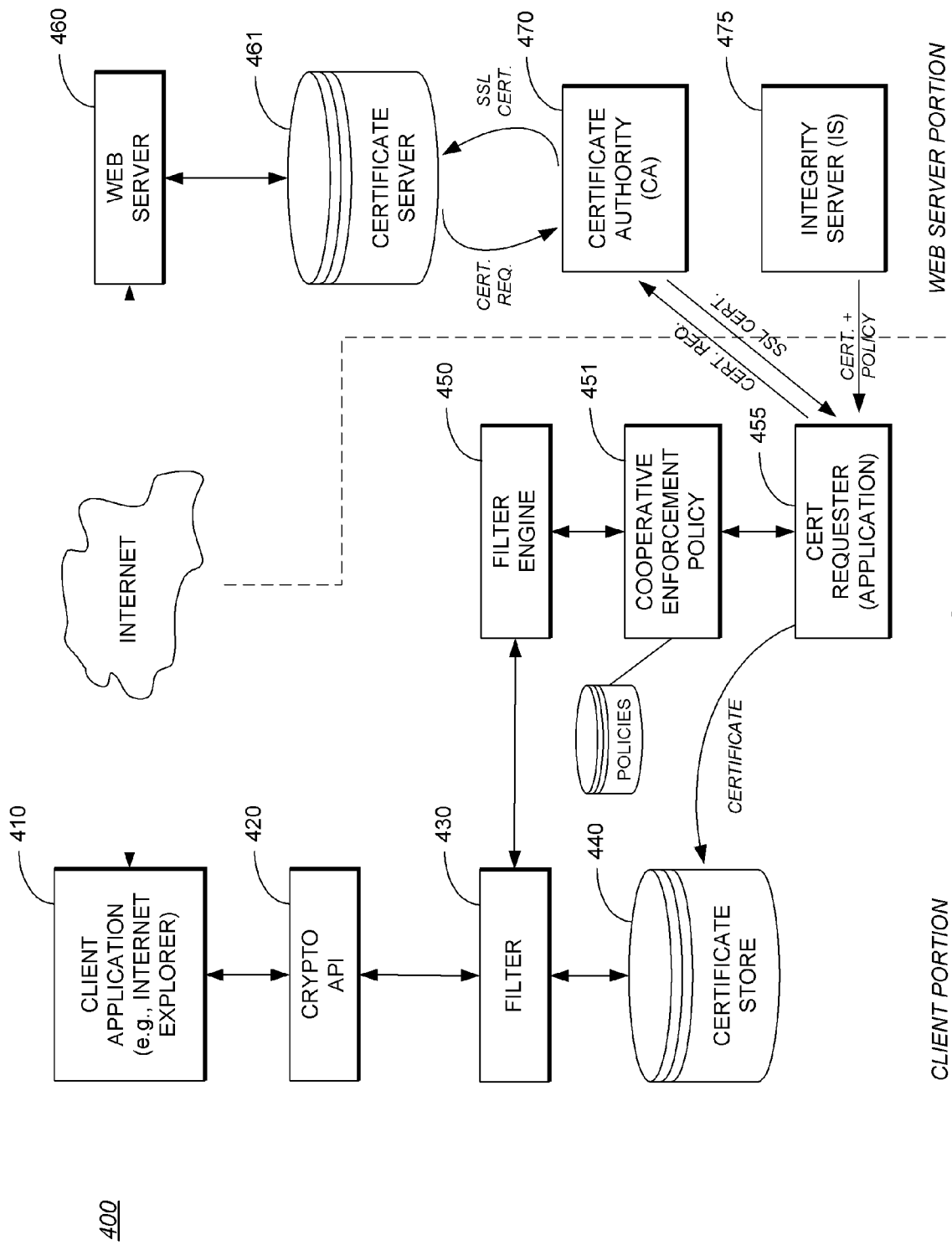
FIG. 4 is a block diagram showing an alternative embodiment of the present invention that provides centralized management.

FIG. 4 is a block diagram showing an alternative embodiment of the present invention that provides centralized management. The system 400 is similar to the system 300 shown in FIG. 3, but the certificate store (now shown at 440) is simplified. As shown, the system 400 includes an additional client component: certificate requester 455. The certificate requester application 455 allows the end user machine/client to request a certificate from the certificate authority (CA) (shown at 470). The certificate requester 455 may be implemented as a client-side agent of the security system. However, Microsoft Internet Explorer already includes a built-in mechanism for requesting certificates (integrated into Active Directory). A number of applications may use this feature (e.g., invoking it through Internet Explorer) to request a certificate. Therefore, the requester application in this context need not be a unique application. Further, one may employ the Microsoft-furnished certificate requester software that is available for use with Active Directory (to request a certificate from the Active Directory's CA); the requester software may be used to manufacture requests for certificates.

In a typical scenario, a certificate request would proceed as follows. First, the initial certificate request document itself is manufactured. This request document is then posted to the CA. The request is listed at the CA (server) on a list of certificate requests. Now, the list may be reviewed by a system administrator who can allow or reject the request. As a result of the system administrator's input, the CA server manufacturers a certificate response. In an enterprise environment, the CA is Active Directory. The certificate response can only be read by the originator of the certificate request (i.e., it is encrypted to an encryption key of the original certificate requester).

In accordance with the present invention, the above is extended such that when the system administrator allows the request to manufacture a certificate, he or she also issues a policy that is to accompany the specific certificate that is being manufactured. This is indicated by IS (Integrity Server) module 475. In this scenario, the certificate requester (application) 455 retrieves both the certificate and the policy. Thus, the policy effectively comes from the certificate server 461. Upon receiving the certificate and policy, the certificate requester 455 stores the certificate in the certificate store and stores the policy in the policy store (i.e., cooperative enforcement policy 451). In an embodiment where the policy is embedded within the certificate (i.e., the two are combined together), both the certificate and its policy are stored in the certificate store 440.

When the client application 410 (e.g., Internet Explorer) tries to access the Web server 460, the application is challenged for a certificate whereupon the application repeats the above-described operation of accessing the certificate store via a the CryptoAPI. The filter 430 of the present invention intercepts that and determines whether or not the application is allowed access based on the policy that was installed. For completeness, the figure also illustrates that the certificate server 461 itself must receive a certificate, which it may obtain from the certificate authority 470. If desired, the embodiment may be extended to bind a policy to the server's certificate, thereby allowing clients to determine whether the server is safe (i.e., complies with the bound policy).

As previously noted, in an enterprise environment the CA is typically Active Directory. Therefore, for the embodiment illustrated in FIG. 4, there is no requirement that the CA be a different CA (e.g., an external CA) other than that already provided by Active Directory. In yet another alternative embodiment, the CA itself may be modified to perform compliance checking before it issues a certificate. This is achieved by a slightly more complex certificate request/response mechanism, performed by a custom CA.

Figure 5:
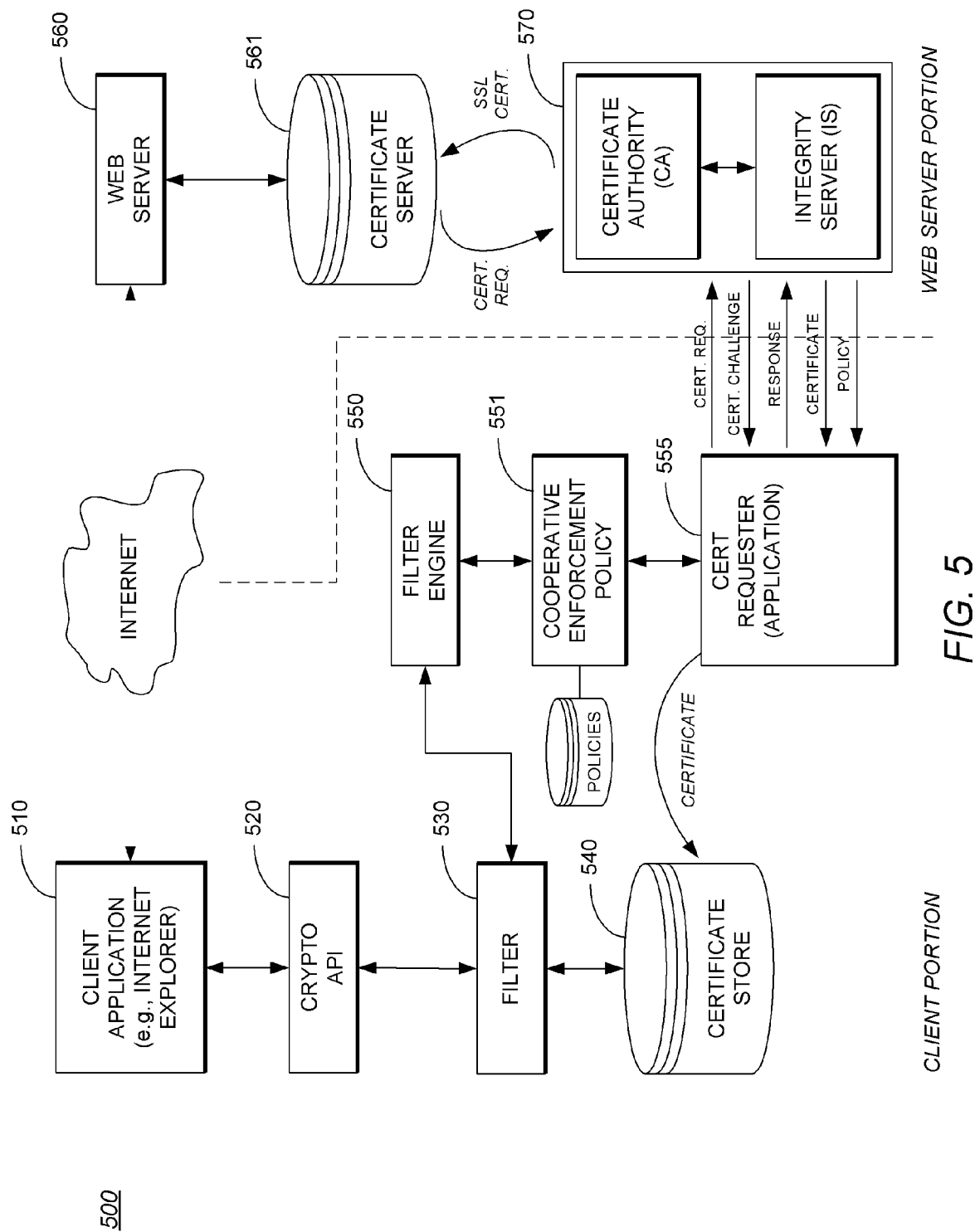
FIG. 5 is a block diagram showing yet another alternative embodiment of the present invention.

FIG. 5 is a block diagram showing yet another alternative embodiment of the present invention. The system 500 is similar to the system 400 shown in FIG. 4, but the CA (now shown combined with IS module at 570) is more sophisticated (as oppose to a standard "plain vanilla" CA). In particular, the CA undertakes enforcement of endpoint security policy compliance before issuing a certificate. In such an embodiment, the CA is more tightly bound with the security system so that a certificate request is coupled with a cooperative enforcement challenge and response. Additionally in this embodiment, the policy is preferably issued at the same time as the certificate, by the combined CA/IS entity 570. Therefore, the operation flow is as follows. The certificate requester application 555 requests a certificate. In response, the CA/IS entity 570 issues a challenge to determine whether the endpoint is in compliance (e.g., using a system similar to an EAP challenge/response system). Here, the certificate requester 555 sends back a cooperative enforcement response. If the client is compliant, then the CA/IS entity 570 may issue a certificate and an accompanying policy. Upon receiving these, the certificate requester 555 stores the certificate in the certificate store 540 and stores the policy in the cooperative enforcement policy 551. Now, the system may respond to policy requests as previously described (e.g., for system 400).

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Figure 6A:
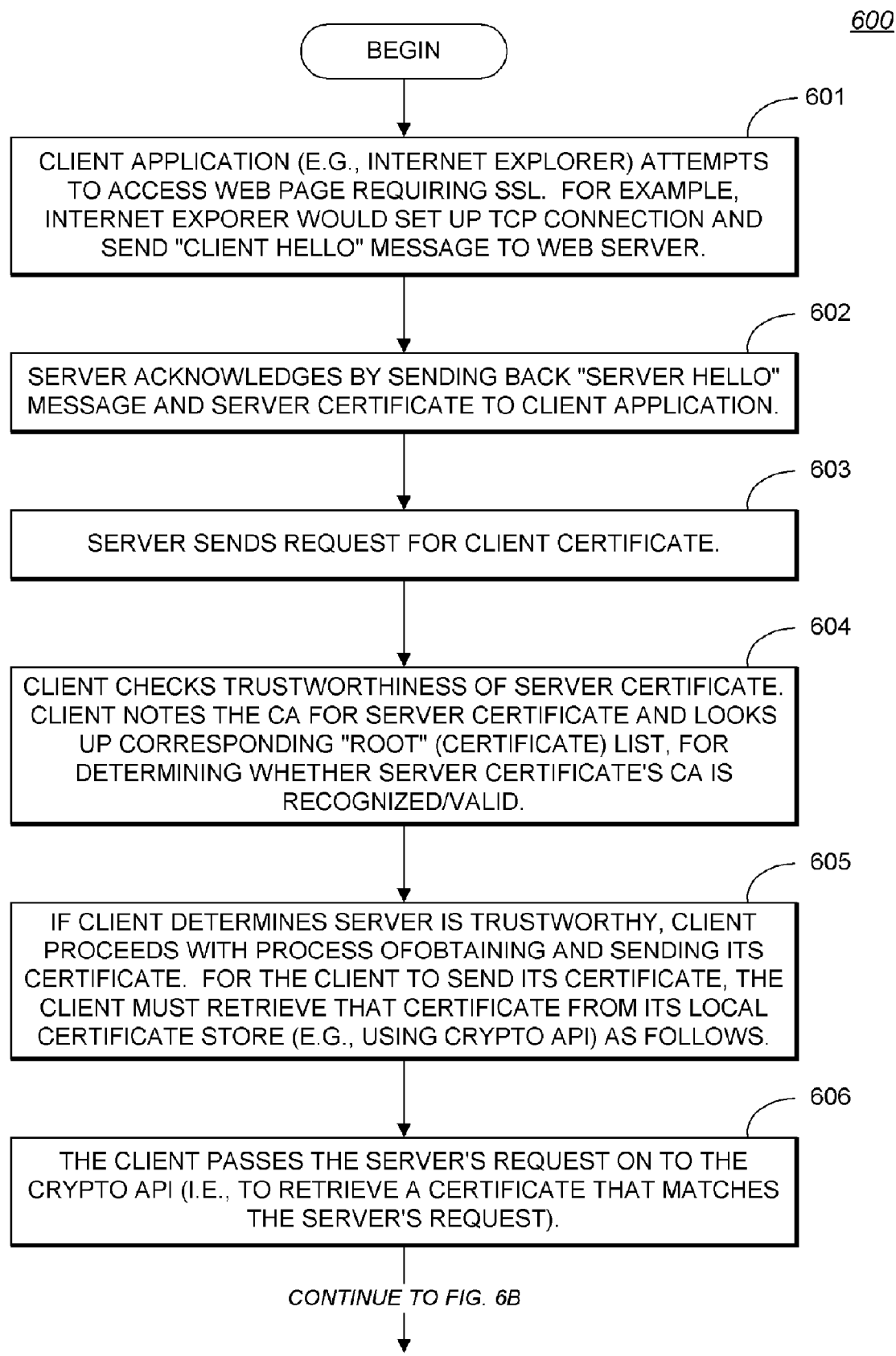
FIGS. 6A-C comprise a single flowchart illustrating operation of the methodology of the present invention.
Figure 6B:
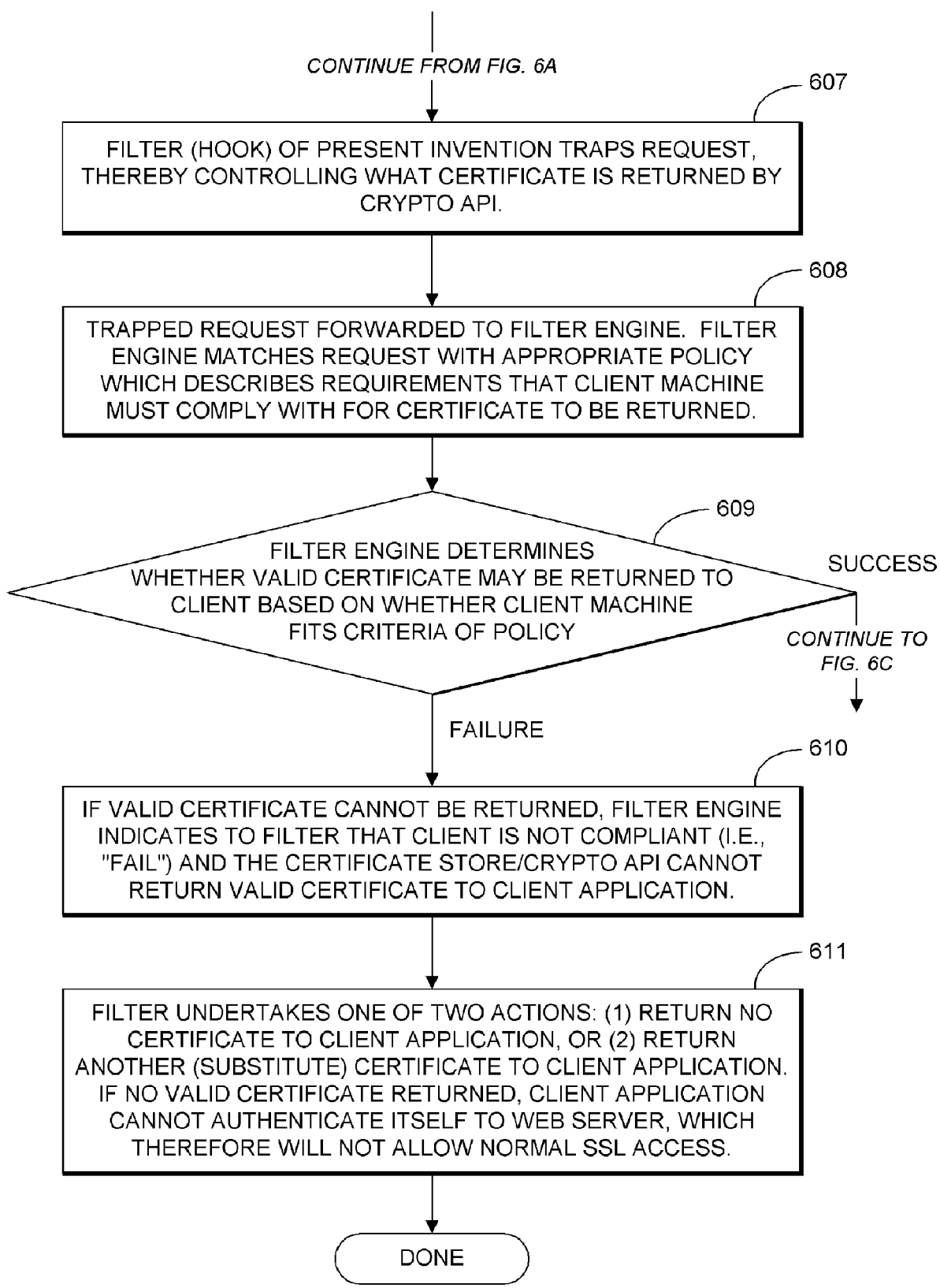
Figure 6C:
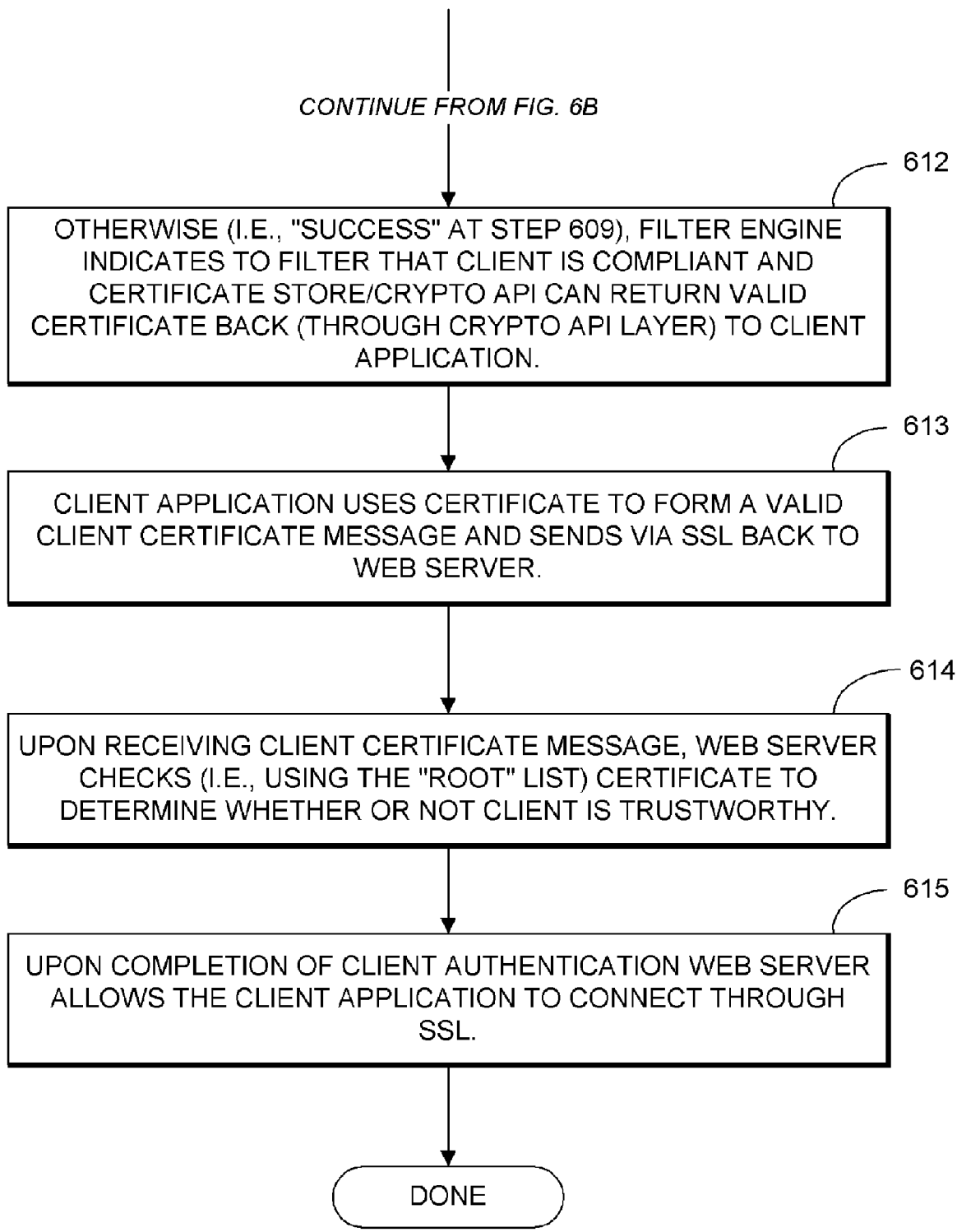

FIGS. 6A-C comprise a single flowchart 600 illustrating operation of the methodology of the present invention. As indicated by the initial step 601, the process begins with a client application (e.g., Internet Explorer) attempting to access a Web page requiring SSL. At this point, Internet Explorer would, for example, first set up a TCP connection to the Web server on port 443 (typically) and send a "client hello" message to the server. At step 602, the server acknowledges by sending back a "server hello" message and a server certificate to the client application. Additionally, at step 603, the server sends a request for the client certificate. Upon receiving this sequence of messages, the client will proceed to check the server certificate, as indicated at step 604. The client checks the trustworthiness of the server certificate as follows. First, the client notes the CA for the server certificate (e.g., a corporate CA). With this information, the client may then proceed to look up the corresponding "root" (certificate) list, for determining whether the server certificate's CA is recognized/valid. Once the client has determined that the server is trustworthy, the client may then proceed with the process of obtaining and sending its certificate, as indicated by step 605. In order for the client to send its certificate, the client must retrieve that certificate from its local certificate store (e.g., using CryptoAPI). By convention, the client is typically designed to reject any server request that is inappropriate (thereby permitting the server from "data mining" for other certificates).

The client proceeds as follows. At step 606, the client passes the server's request on to the CryptoAPI (i.e., to retrieve a certificate that matches the server's request). As indicated at step 607, the filter (hook) of the present invention may trap this request, and thereby control what certificate is returned by the CryptoAPI. In particular, the filter may first determine whether the client complies with the applicable policy (cooperative enforcement policy). Specifically, at step 608, the trapped request is forwarded to the filter engine which matches the request with an appropriate policy (i.e., appropriate for the requested certificate). The policy will describe the requirements that the client machine must comply with, in order for the certificate to be returned. Now, the filter engine may determine, based on whether the machine fits the criteria of the policy, whether compliance is such that a valid certificate may be returned to the client application (e.g., Internet Explorer), as indicated by step 609.

In the case that a valid certificate cannot be returned, then the method proceeds to step 610 where the filter engine indicates to the filter that the client is not compliant (i.e., "fail") and that the certificate store/CryptoAPI cannot return a valid certificate to the client application. Specifically, as shown by step 611, the filter may at this point undertake one of two actions: (1) return no certificate to the client application, or (2) return another (substitute) certificate to the client application. The effect of having no valid certificate returned to the client application is that the client application cannot authenticate itself to the Web server, which therefore will not allow normal SSL access to the client.

Otherwise (i.e., "success" at step 609), the method proceeds to step 612 as illustrated at FIG. 6C. The filter engine indicates to the filter that the client is compliant and that the certificate store/CryptoAPI can simply return the valid certificate back (through the CryptoAPI layer) to the client application, as indicated by step 612. Now, the client application may use that certificate to form a valid client certificate message, to be sent via SSL back to the Web server, as shown at step 613. Upon receiving this message, the Web server may check (i.e., using the "root" list) the certificate to determine whether or not the client is trustworthy, as indicated by step 614. Thereafter (i.e., upon completion of client authentication), the Web server allows the client application to connect through SSL, as shown at step 615. A normal SSL communication sequence may proceed including, for instance, exchange of keys. This establishes a normal SSL session between the client application and the Web server. Data between the two is carried in an encrypted HTTPS tunnel.

Once having done authentication (i.e., using the SSL certificate), the applications that are running on the Web server can determine what kind of access/authorization the client should have based on the identity (certificate) of the client. For example, a power user (based on identity) may receive certain rights/access; a data entry clerk (again, characterized based on identity), on the other hand, may receive a different set of rights. Generally stated, therefore, the privilege level that a given user receives at this point may be based on that user's particular identity (as indicated in the certificate). If desired, this feature may be modified such that the privilege level that a given user receives is embedded in the certificate itself. For example, an arbitrary information field (e.g., blob field) in the certificate may be used by the server to determine what the user's privileges are. The field may, for example, include user name, group name, membership, or the like.

In the case that no certificate is returned, the client application (e.g., Internet Explorer) returns a "failure" message indicating that no client certificate can be returned in response to the server's request. In that scenario, the server should terminate (i.e., "fail") the connection. In the case that an alternative certificate is returned, the following occurs. An alternative certificate, in the currently preferred embodiment, is one that is issued by the same CA as the user certificate. The alternative certificate can be retrieved and returned via the CryptoAPI, whereupon the client application (Internet Explorer) uses that certificate to form a client certificate message to be sent back to the server. Upon the server receiving this alternative or guest certificate, the server will perform its usual checking (i.e., to confirm that it is a valid certificate) and it will proceed to grant access. However, since the certificate identifies the client as a "guest" (as opposed to the actual user), the access granted is constrained (e.g., "guest" access). This may include, for example, redirecting the client to a sandbox (safe) Web page, which may include instructions telling the user how he or she may bring the client machine into compliance. As another alternative, the client may be redirected to an .ASP page that includes custom program logic (e.g., a page that may allow the user or to sign up for additional privileges).

Figure 7A:
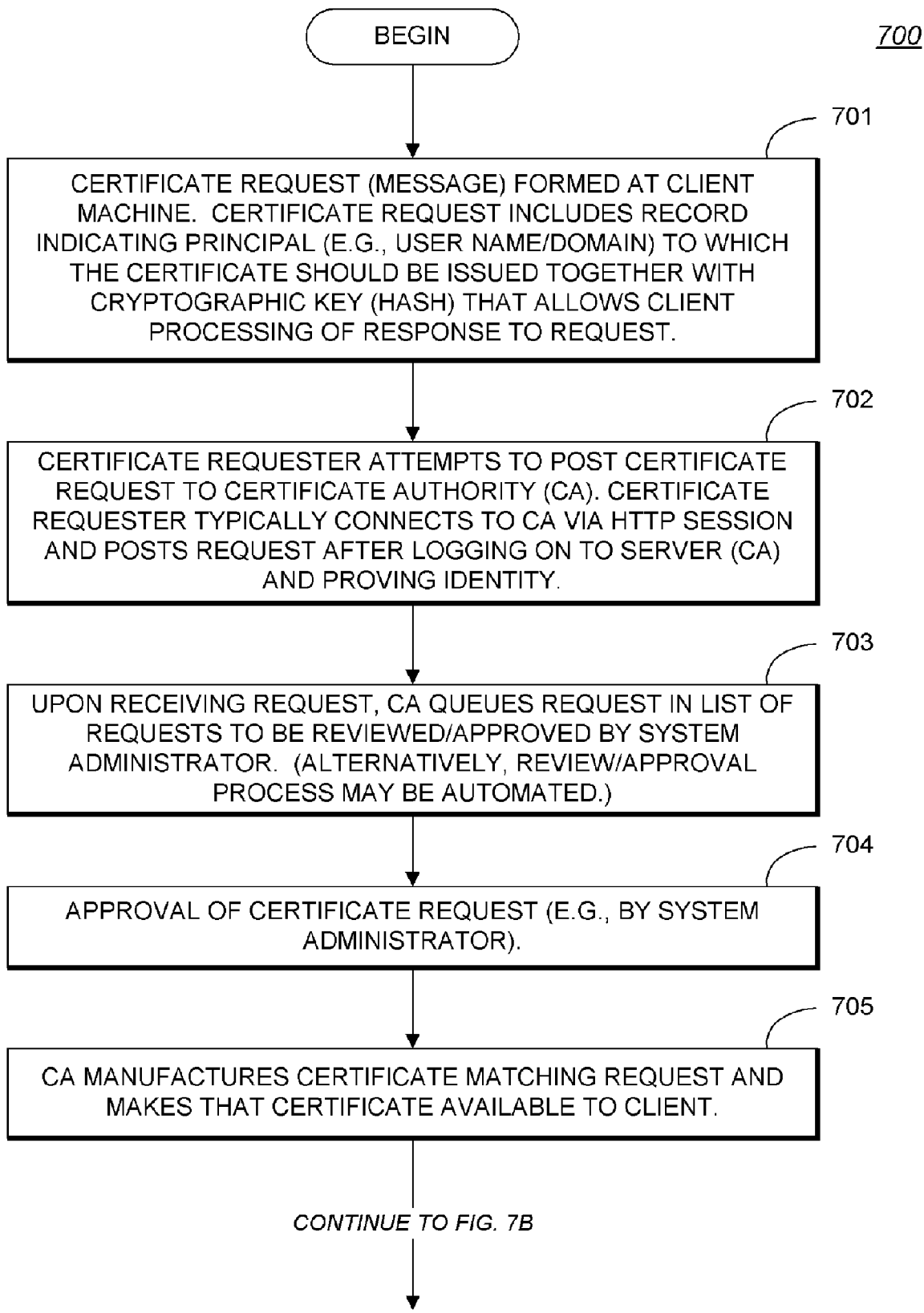
FIGS. 7A-B comprise a single flowchart illustrating the methodology of the present invention for issuing certificates and policies to the client.
Figure 7B:
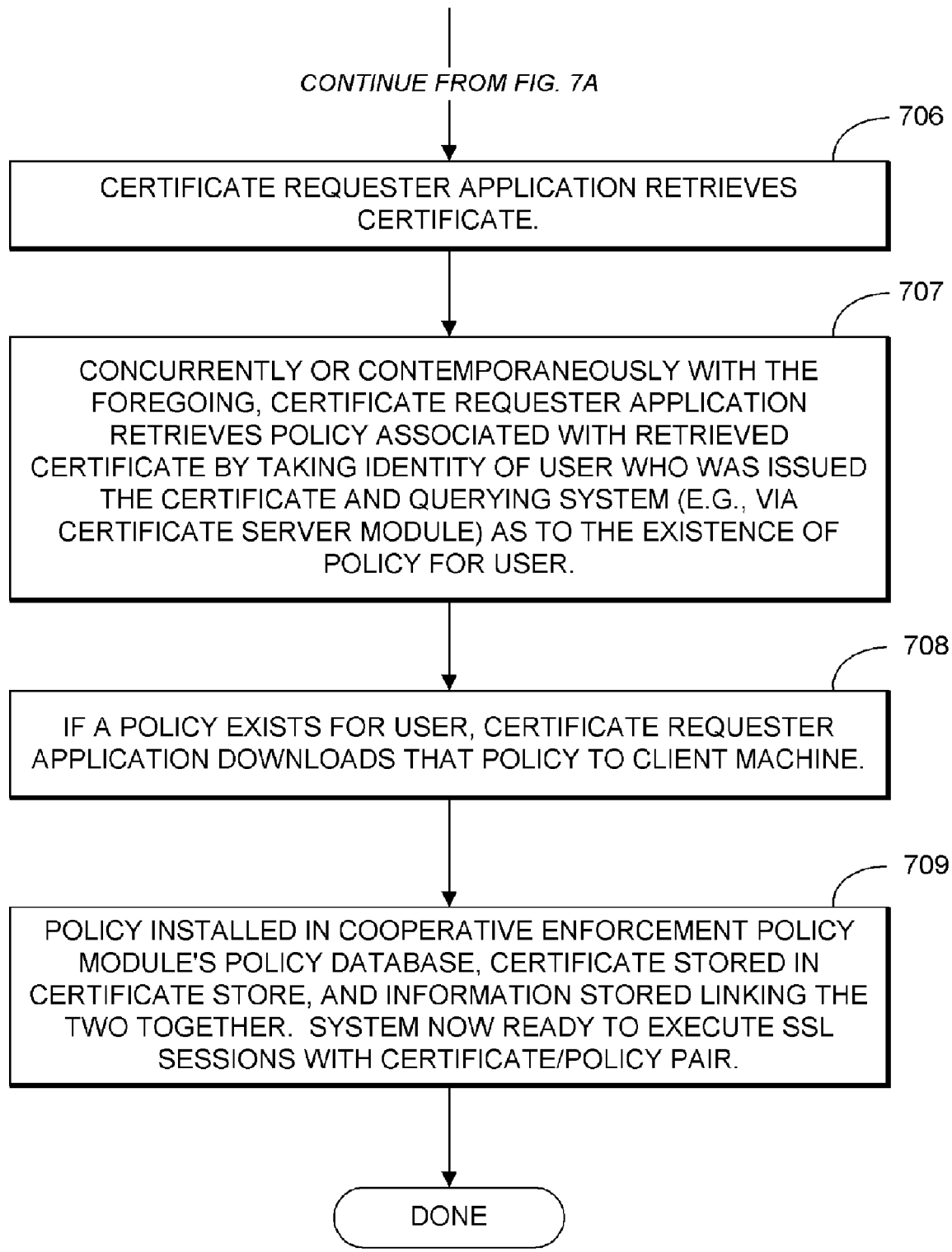

In the embodiment shown in FIG. 3, the certificates and policies are pre-installed together. In the embodiment shown in FIG. 4, this is not the case. FIGS. 7A-B comprise a single flowchart 700 illustrating the methodology of the present invention for issuing certificates and policies to the client. As indicated at step 701, the process begins with a certificate request (message) being formed at the client machine. For example, an end user logged on to the client machine may bring up a certificate requester program, or a system administrator may push the program to the client machine. The formation of a certificate request may be done using conventional techniques, such as using a PGP or a Microsoft Windows requester application (e.g., via Windows CryptoAPI). The certificate request, which is a binary document, includes a record indicating what principal (e.g., user name/domain) the certificate should be issued to, together with a cryptographic key or hash that allows client processing of the response (to the request). The hash is signed by a private key that is the generated by the certificate requester application (which is not shared with others). As indicated at step 702, the certificate requester takes the formed certificate request and attempts to post it to the CA. Typically, this occurs by the certificate requester connecting to the CA via an HTTP session and then posting the request. Commonly, before a machine may post the request, it first must log on to the server (CA) and prove its identity. Otherwise, the CA will not allow the client to post the request. (Additionally, the request must be posted using the same HTTP logon identity.) In other words, the CA will use an out-of-band authentication mechanism before allowing the request to be posted. In a Microsoft Windows environment, for example, this out-of-band authentication mechanism is NT domain. Upon receiving a posted request, at step 703, the CA will queue the request in a list of requests to be reviewed/approved by a system administrator. (Or, if desired, the review/approval process may be automated.) Step 704 indicates approval by the system administrator of a given certificate request. As a result, at step 705, the CA will manufacture a certificate that matches the certificate request and make that certificate available to the client. The certificate requester application now may retrieve the certificate, as indicated at step 706.

Concurrently or contemporaneously with the foregoing, the certificate requester application also retrieves a policy that is associated with the retrieved certificate, as indicated at step 707. This occurs as follows. The certificate requester application takes the identity of the user who was issued the certificate, and then queries the system (e.g., via certificate server module) as to the existence of a policy for this user. If a policy exists for the user (tested at step 708), then the certificate requester application will proceed to download that policy to the client machine. Finally, as indicated at step 709, the policy may be installed in the cooperative enforcement policy module's policy database, the certificate stored in the certificate store, and information stored linking the two together. The policy may be, for example, associated with the certificate by inserting a tag into the policy that identifies the particular associated certificate (e.g., via hash ID). The system is now ready to execute SSL sessions with this given certificate/policy pair, as previously described.

Figure 8A:
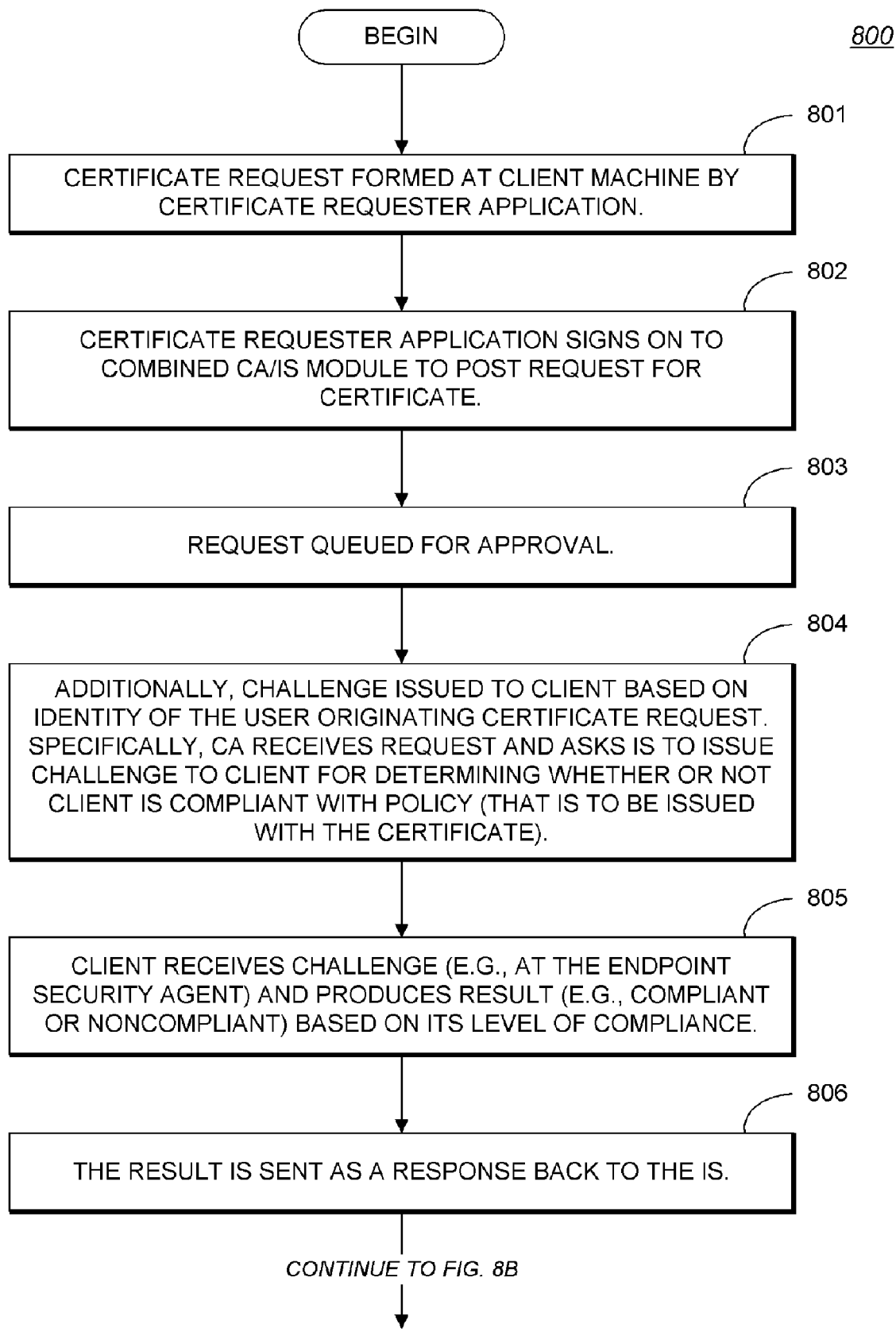
FIGS. 8A-B comprise a single flowchart that illustrates the methodology of the present invention for issuing certificates and policies to the client, from a combined CA/IS module.
Figure 8B:
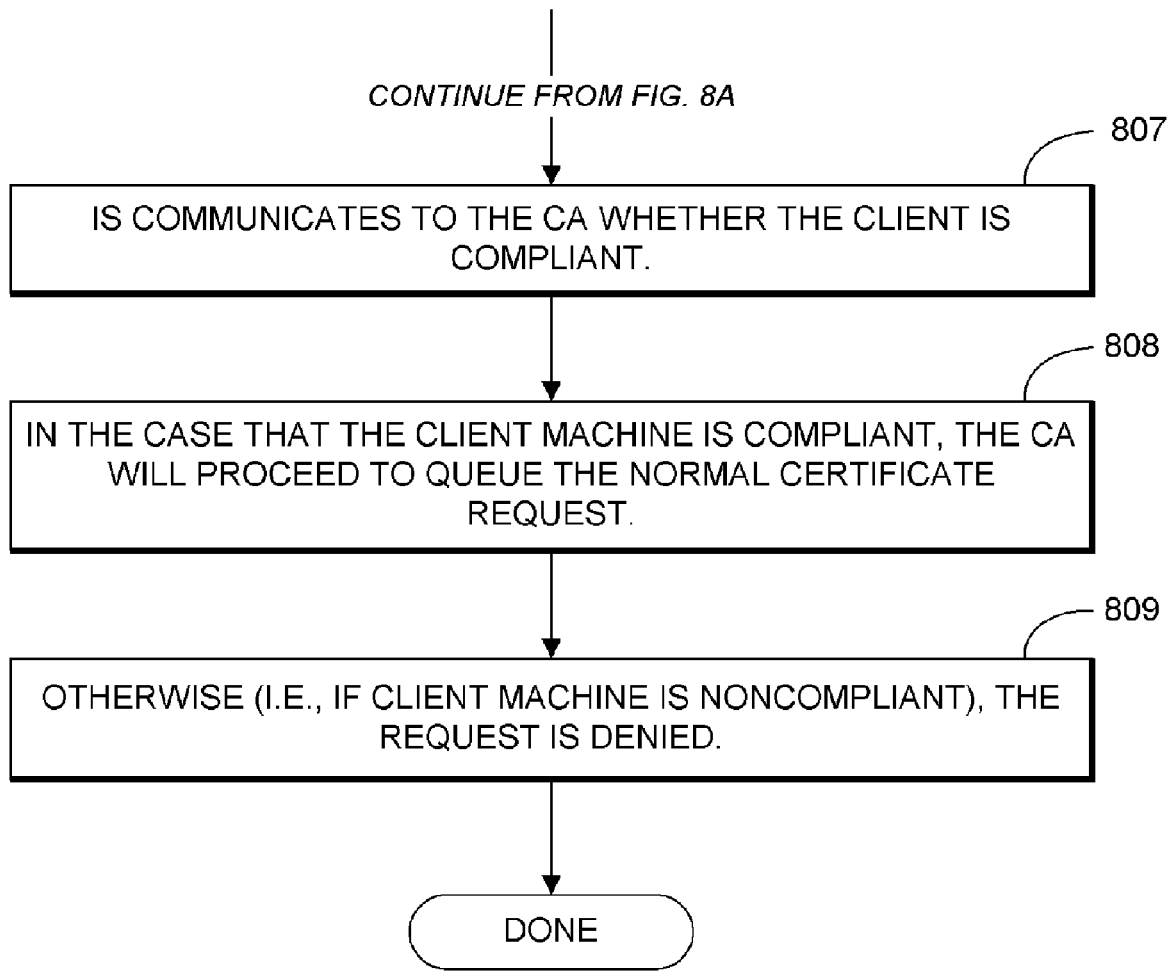

For the embodiment shown in FIG. 5, operation is modified as follows. The certificate requester application includes additional programming logic, and the CA (certificate authority) and IS (integrity server) are combined together to provide better coordination/synchronization of activities. FIGS. 8A-B comprise a single flowchart 800 that illustrates the methodology of the present invention for issuing certificates and policies to the client, from a combined CA/IS module. At step 801, a certificate request is formed at the client machine by the certificate requester application. At step 802, the certificate requester application signs on to the combined CA/IS module to post its request for a certificate. The request is then queued for approval, as indicated at step 803. Additionally, a challenge is issued to the client that is based on the identity of the user who originated the certificate request, as shown at step 804. Specifically at this point, the CA receives the request and then asks the IS to issue a challenge to the client for the purpose of determining whether or not the client is compliant with the policy (that is to be issued with the certificate). At step 805, the client receives the challenge (e.g., at the endpoint security agent) and, based on its level of compliance, produces a result (e.g., compliant or noncompliant). The result is sent as a response back to the IS, as shown at step 806. In turn, the IS will communicate to the CA whether the client is compliant, at step 807. In the case that the client machine is compliant, the CA will proceed to queue the normal certificate request, at step 808. Otherwise (i.e., if client machine is noncompliant), the request is denied, indicated at step 809.

In the case that normal queuing has occurred, the method may proceed in a manner similar to that indicated for the methodology 700 (i.e., a certificate is manufactured, subject to system administrator approval). Again, in a manner similar to that described for methodology 700, the client (requester application) may retrieve the certificate and the policy associated with that certificate, and install them at the client machine.

Additionally, the system and methodology of the present invention may be used to prevent access to certain documents or items of content, by virtue that those items may be decrypted with keys that are associated with particular certificates. Preventing access to the certificates serves as a DRM (digital rights management) mechanism to prevent access to those items of content. The premise behind DRM is to provide rights to a given item of content (e.g., a document) subject to certain conditions. The content is usually encrypted so it cannot be accessed without the proper authentication or electronic key. The methodology of the present invention may be used to validate the client is in compliance with conditions of a policy before issuing a certificate enabling the client to decrypt and access the content.

Embodiment using Windows CryptoAPI

The following describes the currently preferred embodiment, which is implemented using an API hook applied to the Microsoft CryptoAPI. To set the hook, one may use the Detours library, available from Microsoft. The Detours library allows a single macro to hook the target function. Detours is a library for instrumenting arbitrary Win32 functions on x86 machines. Detours intercepts Win32 functions by re-writing target function images. The Detours package also contains utilities to attach arbitrary DLLs and data segments (called payloads) to any Win32 binary. Further information about the Detours library is available from Microsoft Corporation, see, e.g., research.microsoft.com/sn/detours. See, also, Brubacher, D. et al., "Detours: Binary Interception of Win32 Functions," Proceedings of the 3rd USENIX Windows NT Symposium, USENIX, Seattle, Wash., pp. 135-143, July 1999, the disclosure of which is hereby incorporated by reference. A copy is currently available from Microsoft via the Internet (e.g., research.microsoft.com/~galenh/Publications/HuntUsenixNt99.pdf).

The main CryptoAPI function to hook is CertFindChainInStore, which is called to locate a matching certificate chain, given information about the desired certificate issuer. To hook this function, one uses the following Detours macro command:

```
DETOUR_TRAMPOLINE(PCCERT_CHAIN_CONTEXT WINAPI
HookCertFindChainInStore(
HCERTSTORE hCertStore,
DWORD dwCertEncodingType,
DWORD dwFindFlags,
DWORD dwFindType,
const void* pvFindPara,
PCCERT_CHAIN_CONTEXT pPrevChainContext
),
CertFindChainInStore);
```

The CertFindChainInStore function receives a filter function pointer in the pfnFindCallback member of the CERT_CHAIN_FIND_BY_ISSUER_PARA parameter. The API hook replaces this callback function pointer with a pointer to its own filter function, called CertFilter. The API hook also stores away the original function pointer and the callback argument pvFindArg, so that the original application's filter function can be called from the CertFilter function.

```
PCCERT_CHAIN_CONTEXT WINAPI
HookCertFindChainInStore(
    HCERTSTORE hCertStore,
    DWORD dwCertEncodingType,
    DWORD dwFindFlags,
    DWORD dwFindType,
    const void* pvFindPara,
    PCCERT_CHAIN_CONTEXT pPrevChainContext
)
{
    CERT_CHAIN_FIND_BY_ISSUER_PARA
      *pFindByIssuerPara = pvFindPara;
    PFILTER_ARGS args = { pFindByIssuerPara->
      pfnFindCallback,
pFindByIssuerPara- >pvFindArg };
    pFindByIssuerPara->pfnFindCallback = CertFilter;
    pFindByIssuerPara->pvFindArg = &args;
    return pOriginalCertFindChainInStore(
hCertStore,dwCertEncodingType,dwFindFlags,dwFindType,
pvFindPara,pPrevChain
inContext);
}
```

Further description of these Microsoft cryptography functions are available online from the Microsoft Developers Network (msdn.microsoft.com). For example, for the CertFindChainInStore function, see, e.g.,
msdn.microsoft.com/library/default.asp?url=/library/en-us/
    seccrypto/security/certfindchaininstore.asp and
msdn.microsoft.com/library/default.asp?url=/library/en-us/
    seccrypto/security/cert_chain_find_by_issuer_para.asp.

The CertFilter function is called for each certificate that the CertFindChainInStore function considers as a candidate for the session's SSL client certificate. The function retrieves the compliance policy extended attribute from the certificate that is being considered, and if it is present, passes its value to the Check Policy function to determine if the compliance policy is being met.

```
BOOL WINAPI CertFilter(
    IN PCCERT_CONTEXT pCert,
    IN void *pvFindArg)
{
    int iExtensions;
    char *pszValue;
    char *pszObjId;
    BOOL ret = TRUE;
    int i;
    PFILTER_ARGS pFilterArgs;
    iExtensions = pCert->pCertInfo->cExtension;
    if (iExtensions > 0)
    {
        for (i=0; i<iExtensions; i++)
        {
            pszObjId =
pCert->pCertInfo->rgExtension[i].pszObjId;
            if (pszObjId && !strcmp(pszObjId,
szOID_COMPLIANCE_POLICY))
            {
                // policy OID is present
                pszValue =
(char*)malloc(pCert->pCertInfo->rgExtension[i].Value.cbData+1);
                if (pszValue)
                {
                    memcpy(pszValue,
pCert->pCertInfo->rgExtension[i].Value. pbData,
pCert->pCertInfo->rgExtension[i].Value. cbData);
pszValue[pCert->pCertInfo->rgExtension[i].Value. cbData] = 0;
                    ret = CheckPolicy(pszValue);
                    free (pszValue);
                    break;
                }
            }
        }
    }
    if (ret)
    {
        pFilterArgs = (PFILTER_ARGS) pvFindArg;
        pfnOldFilter = pFilterArgs->pfnOldFilter;
        pvFindArg = pFilterArgs->pvFindArg;
        if (pfnOldFilter)
            ret = pfnOldFilter(pCert, pvFindArg);
    }
    return ret;
}
```

The CheckPolicy function interprets the policy attribute, and performs one of three kinds of checks. If the policy attribute is "ayt", the CheckPolicy function calls the True Vector (TV) engine's "tvisTvRunning" function to determine if the TV engine is currently running, and returns FALSE if the TV engine is not running. If the policy attribute is "checkStatus", the CheckPolicy function calls the TV engine's "CheckStatus" function to determine if the client computer is compliant with the currently installed Integrity Server policy requirements. If the policy attribute starts with the substring "policy:", the CheckPolicy function calls the TV engine's "tvIntegrityComplianceInfoEx" function to retrieve the compliance state of an Integrity Client Connection. The name of the Integrity Client Connection is denoted by the text in the policy attribute after the initial "policy:" string; it is presumed to be installed on the local computer already. If either CheckStatus or tvIntegrityQueryCompliance return that the client is not compliant according to the policy, CheckPolicy returns FALSE, otherwise it returns TRUE.

```
BOOL CheckPolicy(char *pszPolicy)
{
    BOOL ret = TRUE;
    if (!stricmp(pszPolicy, "ayt"))
    {
        if (hTvLib == NULL)
            hTvLib = LoadLibrary("vspubapi.dll");
        if (pfnTvIsTvRunning == NULL)
            pfnTvIsTvRunning = (PFNTVISTVRUNNING)
GetProcAddress(hTvLib, " tvIsTvRunning");
        if (pfnTvIsTvRunning != NULL &&
            pfnTvIsTvRunning(NULL,0))
        {
            ret = TRUE;
        }
        else
        {
            ret = FALSE;
        }
    }
    else if (!stricmp(pszPolicy, "checkStatus"))
    {
        if (hTvLib == NULL)
            hTvLib = LoadLibrary("vspubapi.dll");
        if (pfnCheckStatus == NULL)
            pfnCheckStatus = (PFNCHECKSTATUS)
GetProcAddress(hTvLib, " CheckStatus");
        if (pfnCheckStatus != NULL &&
            pfnCheckStatus( ) == AYL_STATUS_SUCCESS) //
ayt_status_success
            ret = TRUE;
        else
            ret = FALSE;
    }
    else if (!strncmp(pszPolicy, "policy:", 7))
    {
        PTV_IC_COMPLIANCE_INFO paComplianceInfo;
        tvIntegrityQueryCompliance(hTVClient, pszPolicy+7,
TVIC_COMPLY_GETLAST,
            &paComplianceInfo);
        ret = (paComplianceInfo[0]->dwCompliance ==
AYT_STATUS_SUCCESS);
        tvFreePtr(paComplianceInfo);
    }
    return ret;
}
```

When CheckPolicy returns FALSE to the CertFilter function, CertFilter itself will return FALSE. This means that the CertFindChaininStore function will not allow the certificate to be used as a client certificate. When CheckPolicy returns TRUE, CertFilter calls the original filter function, and returns the original function's result. If that result is TRUE, then the certificate can be used as a client identity certificate. If the result is FALSE, then the certificate will not be used as a client identity certificate.

While the invention is described in some detail with specific reference to a single-preferred embodiment and certain alternatives, there is no intent to limit the invention to that particular embodiment or those specific alternatives. For instance, while an SSL-based embodiment is employed in the currently preferred embodiment of the present invention, other certificate-based systems may benefit from the present invention. For example, any client that stores a certificate in a certificate (cert) store, and uses a certificate to identify the client to a server, using any protocol, may be aided by application of the present invention. Therefore, it will be appreciated that modifications may be made to the preferred embodiment without departing from the teachings of the present invention.

What is claimed is:

1. A computer-implemented method for controlling communication carried out under SSL (Secure Sockets Layer) protocol, the method comprising:
    defining a security policy having rules indicating conditions under which a machine is permitted to participate in an SSL session, apart from any conditions required by the SSL protocol;
    trapping an attempt by a particular application running on the machine to participate in an SSL session, by intercepting the particular application's attempt to return a certificate that provides authentication;
    determining whether the machine complies with the rules of the security policy;
    if the machine complies with the rules of the security policy, allowing the particular application to return the certificate that provides authentication, thereby allowing the machine to participate in the SSL session; and otherwise
    blocking the particular application from returning the certificate that provides authentication, so that the machine is blocked from participating in the SSL session when the machine does not comply with the rules.

2. The method of claim 1, wherein said rules comprise predefined parameters implementing the security policy.

3. The method of claim 1, wherein said trapping step includes:
    intercepting an attempt at the machine to retrieve a certificate from a client-side certificate store.

4. The method of claim 3, wherein said certificate is installed at the machine contemporaneous with said rules.

5. The method of claim 3, wherein at least some of the rules specify conditions under which particular certificates may be retrieved from said client-side certificate store.

6. The method of claim 3, wherein said rules form a security policy that is stored in the client-side certificate store.

7. The method of claim 3, wherein said rules form a security policy that is stored in individual certificates that reside in the client-side certificate store.

8. The method of claim 3, wherein said rules form a security policy that is stored independently of the client-side certificate store.

9. The method of claim 1, wherein said determining step includes:
    invoking a client-side agent capable of reading said rules and determining whether the machine complies.

10. The method of claim 1, wherein said rules include:
    a rule specifying that the machine must have antivirus software running.

11. The method of claim 10, wherein said rules include:
    a rule specifying that the antivirus software must be up-to-date.

12. The method of claim 1, wherein said rules include:
    a rule specifying that an end point security engine is running.

13. The method of claim 12, wherein said end point security engine includes firewall protection.

14. The method of claim 12, wherein said end point security engine includes protection against spyware.

15. A computer-readable medium having processor-executable instructions for performing the method of claim 1.

16. A system for providing enforcement of a security policy by manipulating retrieval of certificates normally exchanged during a certificate-based protocol session, the system comprising:
   a computer having at least one processor and a memory;
   a security policy indicating conditions under which a client is permitted to participate in a certificate-based protocol session;
   a module that manipulates retrieval of certificates that would otherwise normally be exchanged during the certificate-based protocol session, by intercepting a request to retrieve a certificate for authenticating the client;
   a module that determines whether the client complies with the security policy; and
   a module that blocks retrieval of said certificate in instances where the client does not comply with the security policy, so that the computer is blocked from participating in said certificate-based protocol session when the computer does not comply with said conditions.

17. The system of claim 16, wherein said security policy comprises predefined parameters related to implementing security.

18. The system of claim 16, wherein the module that manipulates retrieval intercepts an attempt at the client to retrieve a certificate from a client-side certificate store.

19. The system of claim 18, wherein said security policy is installed at the client contemporaneous with said certificate.

20. The system of claim 18, wherein said security policy specifies conditions under which a certificate may be retrieved from said client-side certificate store, apart from any conditions required by the protocol.

21. The system of claim 18, wherein said security policy is stored in the client-side certificate store.

22. The system of claim 18, wherein said security policy is stored in individual certificates that reside in the client-side certificate store.

23. The system of claim 18, wherein said security policy is stored independently of the client-side certificate store.

24. The system of claim 16, wherein the module that determines includes a client-side agent capable of reading said security policy and determining whether the client is compliant.

25. The system of claim 16, wherein said security policy includes:
   a requirement that the client must have antivirus software running.

26. The system of claim 25, wherein said security policy includes:
   a requirement that the antivirus software must be up-to-date.

27. The system of claim 16, wherein said security policy includes:
   a requirement that an end point security engine is running.

28. The system of claim 27, wherein said end point security engine provides firewall protection.

29. The system of claim 27, wherein said end point security engine provides protection against spyware.

30. The system of claim 16, wherein said certificate-based protocol session comprises an SSL (Secure Sockets Layer) session.

31. The system of claim 16, further comprising:
   a module that provides a substitute certificate, in response to said request.

32. The system of claim 31, wherein the substitute certificate is manufactured dynamically.

33. The system of claim 31, wherein the substitute certificate indicates a particular condition that the client fails to comply with.

34. The system of claim 31, wherein the substitute certificate indicates that the client fails to comply with antivirus requirements.

35. The system of claim 31, wherein the substitute certificate redirects the client to a web page with information indicating what requirements the client must fulfill to bring the client back into compliance.

36. An improved method implemented in a computer system for retrieving manipulating normal retrieval of certificates for use used in a certificate-based protocols protocol, the improvement comprising:
   monitoring requests to retrieve certificates at a machine during a session employing said certificate-based protocol, for ensuring the machine's compliance with a security policy as a prerequisite to certificate retrieval, said security policy specifying additional conditions beyond those specified by the protocol;
   as each given certificate is requested to be retrieved at the machine, determining whether the machine complies with the security policy; and
   blocking retrieval of a given requested certificate in instances where the machine violates said security policy, so that the machine is blocked from participating in said certificate-based protocol session when the machine does not comply with said additional conditions specified by said security policy.

37. The improved method of claim 36, wherein said monitoring step includes:
   intercepting an attempt at the machine to retrieve a certificate from a certificate store.

38. The improved method of claim 37, wherein at least one particular certificate is associated with a specific security rule that must be followed before that particular certificate can be retrieved.

39. The improved method of claim 36, wherein said security policy includes:
   a rule specifying that particular protective software must be running on the machine.

40. The improved method of claim 39, wherein said particular protective software includes one or more of antivirus, firewall, and anti-spyware software.

41. A system for controlling access to certificates comprising:
   a machine having at least one processor and a memory;
   a certificate store for storing certificates on the machine, said certificates for authenticating the machine according to an existing protocol;
   a security policy specifying conditions that the machine must comply with, in addition to any conditions specified by the existing protocol;
   means for monitoring requests for retrieving a certificate from the certificate store during a session employing said existing protocol, for allowing the system to manipulate retrieval of the certificates in the certificate store in order to enforce compliance with the security policy;
   means for monitoring compliance of the machine with the security policy; and means for blocking retrieval of a particular certificate when the machine does not comply with the security policy, so that the machine is blocked from participating in said session when the machine does not comply with said security policy.

42. The system of claim 41, wherein the security policy includes rules specifying that particular software must be running on the machine.

43. The system of claim 42, wherein the particular software includes selected ones of antivirus software, firewall software, and anti-spyware software.

44. The system of claim 41, further comprising:
means for providing a substitute certificate, that replaces a particular certificate for which retrieval has been prevented.

45. The system of claim 44, wherein said request for retrieval comprises a request to retrieve a certificate in order to authenticate the machine for an SSL (Secure Sockets Layer) session.

\* \* \* \* \*

UNITED STATES PATENT AND TRADEMARK OFFICE
CERTIFICATE OF CORRECTION

PATENT NO. : 7,627,896 B2  Page 1 of 1
APPLICATION NO. : 10/908015
DATED : December 1, 2009
INVENTOR(S) : Conrad K. Herrmann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1229 days.

Signed and Sealed this

Second Day of November, 2010

David J. Kappos
*Director of the United States Patent and Trademark Office*